(12) United States Patent
Silverstein et al.

(10) Patent No.: US 10,851,218 B2
(45) Date of Patent: Dec. 1, 2020

(54) POLYHIPES BY INTERFACIAL STEP-GROWTH POLYMERIZATION

(71) Applicant: Technion Research & Development Foundation Limited, Haifa (IL)

(72) Inventors: Michael S. Silverstein, Zikhron-Yaakov (IL); Liraz Avraham, Beit-SheAn (IL)

(73) Assignee: Technion Research & Development Foundation Limited, Haifa (IL)

( * ) Notice: Subject to any disclaimer, the term of this patent is extended or adjusted under 35 U.S.C. 154(b) by 15 days.

(21) Appl. No.: 16/231,627

(22) Filed: Dec. 24, 2018

(65) Prior Publication Data

US 2019/0127546 A1 May 2, 2019

Related U.S. Application Data

(63) Continuation of application No. PCT/IL2017/050706, filed on Jun. 26, 2017.

(30) Foreign Application Priority Data

Jun. 26, 2016 (IL) .......................................... 246468

(51) Int. Cl.
  *C08J 9/00* (2006.01)
  *C08J 3/03* (2006.01)
  (Continued)

(52) U.S. Cl.
  CPC .............. *C08J 9/283* (2013.01); *C08G 18/14* (2013.01); *C08G 18/24* (2013.01);
  (Continued)

(58) Field of Classification Search
  CPC ........ C08J 9/283; C08J 3/03; C08J 2201/028; C08J 2201/05; C08J 2205/044;
  (Continued)

(56) References Cited

U.S. PATENT DOCUMENTS 2,801,185 A 7/1957 Iler
3,417,171 A 12/1968 Eberle et al.
(Continued)

FOREIGN PATENT DOCUMENTS

CA 2322498 9/1999
CN 107126936 9/2017
(Continued)

OTHER PUBLICATIONS

Dganit et al., "Porous Polyurethanes Synthesized within High Internal Phase Emulsions," Journal of Polymer Science, vol. 47, 5806-5814 (2009). (Year: 2009).*

(Continued)

*Primary Examiner* — Kara B Boyle

(57) ABSTRACT

A polyHIPE-templated composition-of-matter afforded by interfacial polymerization, comprising a polymer of alternating residues of hydrophobic and hydrophilic monomers. The described composition-of-matter is characterized by an open-, quasi-closed- or a truly closed-cell microstructure, whereas the latter is capable of non-releasably or releasably encapsulating an organic or aqueous composition therein for extended periods of time, as well as various uses thereof.

15 Claims, 13 Drawing Sheets

(51) Int. Cl.
*C08J 9/28* (2006.01)
*C08G 18/24* (2006.01)
*C08G 18/42* (2006.01)
*C08G 18/73* (2006.01)
*C08G 18/08* (2006.01)
*C08G 18/72* (2006.01)
*C08G 101/00* (2006.01)

(52) U.S. Cl.
CPC ......... *C08G 18/4266* (2013.01); *C08G 18/72* (2013.01); *C08G 18/73* (2013.01); *C08J 3/03* (2013.01); *C08G 2101/00* (2013.01); *C08J 2201/028* (2013.01); *C08J 2201/05* (2013.01); *C08J 2205/044* (2013.01); *C08J 2205/05* (2013.01); *C08J 2205/052* (2013.01); *C08J 2375/04* (2013.01)

(58) Field of Classification Search
CPC .............. C08J 2205/052; C08J 2375/04; C08J 2205/05; C08G 18/24; C08G 18/4266; C08G 18/73; C08G 18/14; C08G 18/72; C08G 2101/00; C08G 18/3215; C08G 18/3218; C08G 18/6484
See application file for complete search history.

(56) References Cited

U.S. PATENT DOCUMENTS

| | | | |
|---|---|---|---|
| 4,455,205 | A | 6/1984 | Olson et al. |
| 4,478,876 | A | 10/1984 | Chung |
| 4,486,504 | A | 12/1984 | Chung |
| 4,491,508 | A | 1/1985 | Olson et al. |
| 4,522,958 | A | 6/1985 | Das et al. |
| 5,258,225 | A | 11/1993 | Katsamberis |
| 5,648,407 | A | 7/1997 | Goetz et al. |
| 5,652,194 | A | 7/1997 | Dyer et al. |
| 6,147,131 | A | 11/2000 | Mork et al. |
| 6,204,298 | B1 | 3/2001 | DesMarais et al. |
| 6,241,713 | B1 | 6/2001 | Gross et al. |
| 6,353,037 | B1 | 3/2002 | Thunhorst et al. |
| 6,573,305 | B1 | 6/2003 | Thunhorst et al. |
| 6,586,483 | B2 | 7/2003 | Kolb et al. |
| 7,129,277 | B2 | 10/2006 | Baran, Jr. |
| 7,189,768 | B2 | 3/2007 | Baran, Jr. et al. |
| 7,507,780 | B2 | 3/2009 | Hagerty et al. |
| 7,967,367 | B2 | 6/2011 | Cafeo et al. |
| 2002/0091368 | A1 | 7/2002 | LaVon et al. |
| 2003/0097103 | A1 | 5/2003 | Horney et al. |
| 2003/0170308 | A1 | 9/2003 | Cleary et al. |
| 2004/0116594 | A1 | 6/2004 | Bhattacharjee et al. |
| 2004/0204510 | A1 | 10/2004 | Clear et al. |
| 2004/0224021 | A1 | 11/2004 | Omidian et al. |
| 2009/0215913 | A1 | 8/2009 | Thies et al. |
| 2009/0270538 | A1 | 10/2009 | Ikeuchi et al. |
| 2012/0201806 | A1 | 8/2012 | Silverstein et al. |
| 2012/0261803 | A1 | 10/2012 | Wang et al. |
| 2013/0324627 | A1 | 12/2013 | Silverstein et al. |
| 2014/0011897 | A1 | 1/2014 | Friederichs et al. |
| 2014/0328884 | A1 | 11/2014 | Reyes et al. |
| 2015/0166753 | A1 | 6/2015 | Silverstein et al. |
| 2016/0287516 | A1 | 10/2016 | Cosgriff-Hernandez et al. |
| 2017/0189238 | A1 | 7/2017 | Andrews |
| 2017/0326529 | A1 | 11/2017 | Kovacic et al. |
| 2019/0194083 | A1 | 6/2019 | Silverstein et al. |
| 2020/0016574 | A1 | 1/2020 | Kovacic et al. |
| 2020/0123338 | A1 | 4/2020 | Silverstein et al. |
| 2020/0148837 | A1 | 5/2020 | Silverstein et al. |

FOREIGN PATENT DOCUMENTS

| | | |
|---|---|---|
| WO | WO 94/12134 | 6/1994 |
| WO | WO 02/008321 | 1/2002 |
| WO | WO 2009/013500 | 1/2009 |
| WO | WO 2015/076908 | 5/2015 |
| WO | WO 2018/002916 | 1/2018 |
| WO | WO 2018/002916 A8 | 1/2018 |
| WO | WO 2018/033913 | 2/2018 |
| WO | WO 2018/033913 A8 | 2/2018 |
| WO | WO 2019/012529 | 1/2019 |
| WO | WO 2019/016816 | 1/2019 |
| WO | WO 2019/016816 A9 | 5/2019 |
| WO | WO 2019/087185 | 5/2019 |

OTHER PUBLICATIONS

International Preliminary Report on Patentability dated Jan. 30, 2020 From the International Bureau of WIPO Re. Application No. PCT/IL2018/050803. (7 Pages).
International Preliminary Report on Patentability dated Feb. 28, 2019 From the International Bureau of WIPO Re. Application No. PCT/IL2017/050904. (8 Pages).
International Search Report and the Written Opinion dated Jan. 27, 2019 From the International Searching Authority Re. Application No. PCT/IL2018/051158. (12 Pages).
Zhang et al. "Highly Porous, Emulsion-Templated, Zwitterionic Hydrogels: Amplified and Accelerated Uptakes With Enhanced Environmental Sensitivity", Polymer Chemistry, 9(25): 3479-3487, Published Online May 21, 2018.
International Preliminary Report on Patentability dated Jan. 10, 2019 From the International Bureau of WIPO Re. Application No. PCT/IL2017/050706. (10 Pages).
International Search Report and the Written Opinion dated Nov. 1, 2018 From the International Searching Authority Re. Application No. PCT/IL2018/050803. (11 Pages).
International Search Report and the Written Opinion dated Nov. 12, 2017 From the International Searching Authority Re. Application No. PCT/IL2017/050904. (13 Pages).
International Search Report and the Written Opinion dated Nov. 20, 2018 From the International Searching Authority Re. Application No. PCT/IL2018/050751. (15 Pages).
International Search Report and the Written Opinion dated Sep. 27, 2017 From the International Searching Authority Re. Application No. PCT/IL2017/050706. (17 Pages).
Notice of Omitted Item(s) in a Nonprovisional Application dated Jan. 8, 2015 From the US Patent and Trademark Office Re. U.S. Appl. No. 14/578,519.
Office Action and Search Report dated Mar. 1, 2017 From the Israel Patent Office Re. Application No. 247302. (7 Pages).
Office Action and Search Report dated Dec. 4, 2016 From the Israel Patent Office Re. Application No. 245656. (7 Pages).
Office Action and Search Report dated Sep. 5, 2018 From the Israel Patent Office Re. Application No. 256783. (14 Pages).
Office Action and Search Report dated Mar. 11, 2018 From the Israel Patent Office Re. Application No. 255404. (7 Pages).
Office Action and Search Report dated Mar. 16, 2017 From the Israel Patent Office Re. Application No. 246468. (8 Pages).
Office Action dated Sep. 7, 2017 From the Israel Patent Office Re. Application No. 247302 and Its Translation Into English. (12 Pages).
Office Action dated Feb. 8, 2018 From the Israeli Patent Office Re. Application No. 247302 and Its Translation Into English. (11 Pages).
Office Action dated Jul. 16, 2017 From the Israel Patent Office Re. Application No. 245656 and Its Translation Into English. (4 Pages).
Office Action dated Nov. 16, 2016 From the Israel Patent Office Re. Application No. 246468. (2 Pages).
Office Action dated Jun. 21, 2016 From the Israel Patent Office Re. Application No. 245656. (3 Pages).
Office Action dated May 23, 2016 From the Israel Patent Office Re. Application No. 245656. (2 Pages).
Office Action dated Sep. 25, 2016 From the Israel Patent Office Re. Application No. 247302. (1 Page).
Office Action dated Dec. 28, 2017 From the Israel Patent Office Re. Application No. 253431. (4 Pages).
Office Action dated Sep. 28, 2017 From the Israel Patent Office Re. Application No. 246468 and Its Translation Into English. (6 Pages).

(56) References Cited

OTHER PUBLICATIONS

Office Action dated Aug. 30, 2018 From the Israel Patent Office Re. Application No. 247302 and Its Translation Into English. (13 Pages).
Office Action dated Feb. 8, 2018 From the Israel Patent Office Re. Application No. 246468 and Its Translation Into English. (4 Pages).
Official Action dated Sep. 5, 2014 From the US Patent and Trademark Office Re. U.S. Appl. No. 13/369,362.
Official Action dated Oct. 6, 2015 From the US Patent and Trademark Office Re. U.S. Appl. No. 14/578,519.
Official Action dated May 13, 2014 From the US Patent and Trademark Office Re. U.S. Appl. No. 13/892,606.
Official Action dated Nov. 20, 2018 From the US Patent and Trademark Office Re. U.S. Appl. No. 15/595,970. (38 Pages).
Restriction Official Action dated Feb. 12, 2014 From the US Patent and Trademark Office Re. U.S. Appl. No. 13/892,606.
Audouin et al. "Preparation, Solid-State NMR, and Physicochemical Characterization of Surprisingly Tough Open Cell PolyHIPEs Derived From 1-Vinyl-1,2,4-Triazole Oil-in-Water Emulsions", Macromolecules, 44(12): 4879-4886, May 27, 2011.
Audouin et al. "Synthesis of Porous Materials by 2-Nitroresorcinol/Cyanuric Chloride Thermal Polycondensation in Emulsions", Journal of Applied Polymer Science, 108(5): 280802813, Published Online Feb. 25, 2008.
Barbetta et al. "High Internal Phase Emulsions (HIPEs) Containing Divinylbenzene and 4-Venylbenzyl Chloride and the Morphology of the Resulting PolyHIPE Materials", Chemical Communications, p. 221-222, 2000.
Chung et al. "The Thermoresponsive Shape Memory Characteristics of Polyurethane Foam", Journal of Applied Polymer Science, 117: 2265-2271, 2010.
Cohen Samoocha "Bicontinuous Hydrogel-Filled Hydrophobic Polymers Synthesized Within Polymer-Nanoparticle-Stabilized Pickering Emulsions", M.Sc Thesis, Department of Materials Science and Engineering, Abstract. Apr. 2015.
Colver et al. "Cellular Polymer Monoliths Made via Pickering High Internal Phase Emulsions", Chemical Materials, 19: 1537-1539, 2007.
David et al. "Porous Polyurethanes Synthesized Within High Internal Phase Emulsions", Journal of Polymer Science Part A: Polymer Chemistry, 47(21): 5806-5814, Sep. 28, 2009. Abstract, Fig.3, p. 5807-5808, p. 5809, Line 2, 5813.
Deleuze et al. "Preparation and Functionalisation of Emulsion-Derived Microcellular Polymeric Foams (PolyHIPEs) by Ring-Opening Metathesis Polymerisation (ROMP)", Chemistry Communications, 2002(23): 2822-2823, Advance Publication Oct. 25, 2002.
Gitli et al. "Emulsion Templated Bicontinuous Hydrophobic-Hydrophilic Polymers: Loading and Release", Polymer, 52(1): 107-115, Available Online Nov. 13, 2010.
Gurevitch et al. "Nanoparticle-Based and Organic-Phase-Based AGET ATRP PolyHIPE Synthesis Within Pickering HIPEs and Surfactants-Stabilized HIPEs", Macromolecules, 44(9): 3398-3409, Apr. 15, 2011.
Gurevitch et al. "Polymerized Pickering HIPEs: Effects of Synthesis Parameters on Porous Structure", Journal of Polymer Science, Part A: Polymer Chemistry, 48: 1516-1525, 2010.
Ikem et al. "High Internal Phase Emulsions Stabilized Solely by Functionalized Silica Particles", Angewandte Chemie, International Edition, 47: 8277-8279, 2008.
Kabiri et al. "Novel Sulfobetaine-Sulfonic Acid-Contained Superswelling Hydrogels", Polymers for Advanced Technologies, 16(9): 659-666, Published Online Aug. 4, 2005.
Kapilov-Buchman et al. "Water-Filled Elastomers Through Droplet Microencapsulation: Release and Degradation", Department of Materials Science and Engineering, Technion—Israel Institute of Technology, Haifa, Israel, Poster, Dec. 31, 2015.
Kapilov-Buchman et al. "Water-Filled Elastomers Through Droplet Microencapsulation: Release and Degradation", Presentation in the Conference IMEC, BarIlan University, Israel, Feb. 1-2, 2016, 17 P., Feb. 2, 2016.
Kovacic et al. "Superabsorbent, High Porosity, PAMPS?Based Hydrogels Through Emulsion Templating", Macromolecular Rapid Communications, 37(22): 1814-1819, Sep. 2016.
Kovacic et al. "Macroporous Double Network Hydrogels Through Emulsion Templating", Presented at the Polymer Chemistry Gordon Research Conference, Poster, Jun. 30, 2015.
Lalani et al. "Electrospun Zwitterionic Poly(Sulfobetaine Methacrylate) for Nonadherent, Superabsorbent, and Antimicrobial Wound Dressing Applications", Biomacromolecules, 13(6): 1853-1863, Apr. 30, 2012.
Laschewsky "Structures and Synthesis of Zwitterionic Polymers", Polymers, 6(5): 1544-1601, May 23, 2014.
Luo et al. "One-Pot Interfacial Polymerization to Prepare PolyHIPEs With Functional Surface", Colloid and Polymer Science, 293(6): 1767-1779, Published Online Mar. 25, 2015.
Madhusudhana et al. "Bicontinuous Highly Cross-Linked Poly(Acrylamide-Co-Ethyleneglycol Dimethacrylate) Porous Materials Synthesized Within High Internal Phase Emulsions", Soft Matter, 7: 10780-10786, Sep. 28, 2011. p. 10781, Left Col., Lines 11-15, PolyHIPES Synthesis Section, p. 10782, Left Col., Lines 28-37, p. 10785, Right Col., Lines 5-8, p. 10786, Left Col., Lines 3-5.
Maji et al. "Dual-Stimuli-Responsive L-Serine-Based Zwitterionic UCST-Type Polymer With Tunable Thermosensitivity", Macromolecules, 48(14): 4957-4966, Jul. 20, 2015.
Menner et al. "High Internal Phase Emulsion Templates Solely Stabilised by Functionalised Titania Nanoparticles", Chemical Communications, p. 4274-4276, 2007.
Menner et al. "Particle-Stabilized Surfactant-Free Medium Internal Phase Emulsions as Templates for Porous Nanocomposite Materials: Poly-Pickering-Foams", Langmuir, 23: 2398-2403, 2007.
Mülhaupt "Catalytic Polymerization and Post Polymerization Catalysis Fifty Years After the Discover of Ziegler's Catalysts", Macromolecular Chemistry and Physics, 204(2):289-327, Feb. 2003.
Oh et al. "Injectable, Interconnected, High-Porosity Macroporous Biocompatible Gelatin Scaffolds Made by Surfactant-Free Emulsion Templating", Macromolecular Rapid Communications, 36(4): 364-372, Published Online Dec. 10, 2014.
Silverstein "Emulsion-Templated Porous Polymers: A Retrospective Perspective", Polymer, 55(1): 304-320, Available Online Sep. 11, 2013. Abstract, p. 262, Lines 20-22, p. 271, Lines 23-35, p. 273, Lines 10-11, Table S-4.
Silverstein et al. "PolyHIPEs—Porous Polymers From High Internal Phase Emulsions", Encyclopedia of Polymer Science and Technology, p. 1-24, 2010.
Streifel et al. "Porosity Control in High Internal Phase Emulsion Templated Polyelectrolytes via Ionic Crosslinking", Journal of Polymer Science, Part A: Polymer Chemistry, 54(16): 2486-2492, Published Online Apr. 13, 2016. Abstract, p. 1, col. 1, Lines 6-10.
Tan et al. "Synthesis and Aqueous Solution Properties of Sterically Stabilized PH-Responsive Polyampholyte Microgels", Journal of Colloid and Interface Science, 309: 453-463, Available Online Feb. 16, 2007.
Tobushi et al. "The Influence of Shape-Holding Conditions on Shape Recovery of Polyurethane-Shape Memory Polymer Foams", Smart Materials and Structures, 13: 881-887, 2005.
Unknown "Salt Solution-Filled Elastomeric Monoliths Through Templating Within Pickering Emulsions: Release and Degradation", 1 P., Jul. 2016.
Yakacki et al. "Strong, Tailored, Biocompatible Shape-Memory Polymer Networks", Advanced Functional Materials, 18(16): 2428-2435, Aug. 22, 2008.
Zhang et al. "Doubly-Crosslinked, Emulsion-Templated Hydrogels Through Reversible Metal Coordination", Polymer, 126: 386-394, Jul. 18, 2017. Esp. Sections 2.2-2.4, Section 3.9.
Zhang et al. "PMMA Based Foams Made via Surfactant-Free High Internal Phase Emulsion Templates", Chemical Communications, p. 2217-2219, 2009.
Zheng et al. "Metal-Coordination Complexes Mediated Physical Hydrogels with High Toughness, Stick-Slip Tearing Behavior, and Good Processability", Macromolecules, 49(24), 9637-9646, Dec. 2016.

(56) References Cited

OTHER PUBLICATIONS

Zhou et al. "Ion-Responsive Alginate Based Macroporous Injectable Hydrogel Scaffolds Prepared by Emulsion Templating", Journal of Materials Chemistry B: Materials for Biology and Medicine, 1(37): 4736-4745, Oct. 7, 2013.
Zhu et al. "Monolithic Supermacroporous Hydrogel Prepared From High Internal Phase Emulsions (HIPEs) for Fast Removal of Cu2+ and Pb2+", Chemical Engineering Journal, 284: 422-430, Available Online Sep. 9, 2015.
International Preliminary Report on Patentability dated Jan. 23, 20120 From the International Bureau of WIPO Re. Application No. PCT/IL2018/050751. (10 Pages).
Supplementary European Search Report and the European Search Opinion dated Jan. 22, 2020 From the European Patent Office Re. Application No. 17819486.6. (11 Pages).
Avraham "Liraz Avraham—Materials Engineer—GOI (Government of Israel)", LinkedIn, XP055657899, 6 P., Jan. 14, 2020.
Avraham et al. "Porous, Polysaccharide-Containing Poly(Urethane Urea) Monoliths Through Emulsion Templating", Department of Materials Science and Engineering, Technion—Israel Institute of Technology, XP055657891, 1 P., Dec. 31, 2015.
Warwar Damouny et al. "Hydrogel-Filled, Semi-Crystalline, Nanoparticle-Crosslinked, Porous Polymers From Emulsion Templating: Structure, Properties, and Shape Memory", Polymer, XP029381315, 82: 262-273, Available Online Nov. 23, 2015.

\* cited by examiner

POLYHIPES BY INTERFACIAL STEP-GROWTH POLYMERIZATION

RELATED APPLICATIONS

This application is a Continuation Patent Application of PCT Patent Application No. PCT/IL2017/050706 having International filing date of Jun. 26, 2017, which claims the benefit of priority of Israel Patent Application No. 246468 filed on Jun. 26, 2016. The contents of the above applications are all incorporated by reference as if fully set forth herein in their entirety.

FIELD AND BACKGROUND OF THE INVENTION

The present invention, in some embodiments thereof, relates to material science, and more particularly, but not exclusively, to step-growth polymerization polyHIPE structures and uses thereof.

Polymeric porous materials have multitude of uses and applications in almost every aspect of life, from insulators to matrices for living tissue, from textile and consumer products to industrial and agricultural projects, from leisure and play to medical and pharmaceutical, and the likes.

A large variety of porous polymers, generally known as polyHIPEs, have been synthesized using high internal phase emulsions (HIPEs) as templates for the porous structure. These porous polymers, usually synthesized through free radical polymerization, include both hydrophobic polymers synthesized within water-in-oil (W/O) emulsions and hydrophilic polymers synthesized within oil-in-water (O/W) emulsions. The types of materials synthesized include copolymers, interpenetrating polymer networks, biodegradable materials, organic-inorganic hybrids that can be pyrolyzed to porous inorganics, nanocomposites, and hydrophobic-hydrophilic bicontinuous polymers. The large number of methods available to functionalize polyHIPEs have enhanced their utility for such applications as chemical synthesis, chromatography, ion exchange, separation, sensing, tissue engineering, and controlled drug delivery, to name but a few.

HIPEs are highly viscous, paste-like emulsions in which the dispersed, internal phase constitutes more than 74% of the volume. HIPEs are inherently unstable and have a tendency to undergo phase inversion. Only a few of the available emulsifiers are able to keep the major internal phase dispersed within the minor external phase. Such an emulsifier must be highly insoluble in the internal phase and its molecular packing must promote the formation of a convex interface between the external and internal phases. If the internal phase, external phase, or both phases contain monomers then a polymer can be synthesized within the HIPE. The biphasic structure of HIPEs can be maintained during polymerization under the right conditions. A concentrated latex results if the discrete, internal phase contains monomers. A polyHIPE, a continuous polymer envelope surrounding the dispersed droplets of the internal phase, results if the continuous, external phase contains monomers.

In some cases there is often a difference between the microstructure of a HIPE and the structure of the resulting polyHIPE. Ruptures, termed holes, interconnects or windows can develop at the thinnest points of the external phase envelope surrounding the dispersed internal phase (walls) under the right conditions (e.g., appropriate surfactant and internal phase contents). Such holes can also form during post-polymerization processing. The formation of these holes transforms the discrete droplets of the internal phase into a continuous interconnected phase. Removal of the internal phase, which is now continuous, yields an open-cell void structure templated by the droplets that formed the HIPE's internal phase. The holes in the polymer wall yield a highly interconnected porous structure. The porous structure of polyHIPEs can be manipulated through variations in the structure of the HIPEs.

A polyHIPE where the polymer walls remain intact, as in the precursor HIPE, is referred to as a closed-cell polyHIPE. The closed-cell microstructure is sometimes misleading when inspected visually under an electron microscope, as the completeness and permeability of the walls is not challenged by mechanical, physical and chemical conditions. Since the voids in a closed-cell microstructure still contain the dispersed phase medium, the impermeability of the cells should be tested by loss of mass of the polyHIPE under drying conditions. A cell structure that visually resembles a closed-cell structure but from which the internal phase can essentially be removed, is termed herein a quasi-closed-cell structure. Research done on polymerizing monomers in the external phases of emulsions prior to 1982 include the synthesis of seemingly closed-cell structures from HIPEs containing up to 85% water in the internal phase and with styrene or methyl methacrylate (MMA) in the external phase. Other research produced seemingly closed-cell polyHIPEs containing up to 90% water in the internal phase and a mixture of unsaturated polyester and styrene in the external phase. A true closed-cell polyHIPE was first provided in U.S. Pat. No. 9,062,245, wherein a Pickering stabilized HIPE was formed under conditions that ensured the locus of initiation of polymerization, and the locus of crosslinking the polymer was at the interface of the phases.

The synthesis of polyHIPEs using step-growth polymerization has met with limited success. Usually, the resulting porous structures are less highly interconnected and have relatively high densities. The reactions studied include base-catalyzed polycondensation of 2-nitroresorcinol with cyanuric chloride [Audouin, F. et al., *J. Appl. Polym. Sci.*, 2008, 108, pp. 2808-2813] and the reaction of an isocyanate with a polyol to produce polyurethane (PU) [David, D. and Silverstein, M. S., *J. Polym. Sci. A: Polym. Chem.*, 2009, 47, pp. 5806-5814]. EP 289238 provides polyHIPEs synthesized through resorcinol-formaldehyde step-growth polymerization in oil-in-water (O/W) HIPEs, as well as other polyHIPE systems synthesized through step-growth polymerization, including urea-formaldehyde, phenol-formaldehyde, melamine-formaldehyde, and a system based on a polysiloxane elastomer. In addition, ring opening metathesis polymerization, which is not a "step-growth" process, was used to synthesize a polyHIPE from tetracyclo[6.2.13,6.02,7]dodeca-4,9-diene at −15° C. and from dicyclopentadiene and tetracyclododecene at 80° C. using ruthenium catalysts [Deleuze, H. et al., *Chem. Commun.*, 2002, pp 2822-2823]. All the above-mentioned step-growth reactions occur completely in the external phase of the HIPE, while the chemicals in the internal phase do not participate as monomers in forming the polymer. This approach has limited the resulting polyHIPEs in the composition of the step-growth polymers to monomers that are soluble in one phase and not the other, but not a combination of monomers which are soluble substantially in only one of the two phases.

SUMMARY OF THE INVENTION

Provided herein is a composition-of-matter having a structure of a polyHIPE made of a polymer which is formed by interfacial polymerization from at least one monomer that is soluble in aqueous media and substantially immiscible in organic media (hydrophilic monomer) and at least one monomer that is soluble in organic media and substantially immiscible in aqueous media (hydrophobic monomer). The composition-of-matter can have an open-, quasi-closed-cell, or a closed-cell microstructure. A composition-of-matter having a closed-cell polyHIPE encapsulates in its closed cells the remainder of the internal phase of the preceding HIPE, namely a composition that is entrapped therein for extended periods of time, and in some embodiments can be released from the composition-of-matter, e.g., upon deformation thereof.

According to an aspect of some embodiments of the present invention there is provided a composition-of-matter that includes a polymer, with the polymer's main chain comprised of alternating residues of at least one hydrophilic monomer and at least one hydrophobic monomer, having a microstructure of a polymerized high internal phase emulsion (HIPE).

According to some embodiments of the invention, the HIPE is a water-in-oil HIPE or an oil-in-water HIPE.

According to some embodiments of the invention, the composition-of-matter presented herein is characterized by a closed-cell microstructure, a quasi-closed cell microstructure or an open-cell microstructure.

According to some embodiments of the invention, the HIPE is a water-in-oil HIPE and the composition-of-matter has a closed-cell microstructure and further includes an aqueous composition encapsulated therein.

According to some embodiments of the invention, the aqueous composition is releasably encapsulated in the composition-of-matter.

According to some embodiments of the invention, the encapsulated aqueous composition is releasable.

According to some embodiments of the invention, the HIPE is an oil-in-water HIPE and the composition-of-matter has a closed-cell microstructure and further includes an organic composition encapsulated therein.

According to some embodiments of the invention, the organic composition is releasably encapsulated in the composition-of-matter.

According to some embodiments of the invention, the encapsulated organic composition is releasable.

According to some embodiments of the invention, the composition-of-matter presented herein is characterized by a modulus of more than 500 Pa.

According to some embodiments of the invention, the encapsulated organic composition is releasable from the closed-cell microstructure.

According to some embodiments of the invention, the encapsulated organic composition includes an organic solvent, an oil, a fragrance, a bioactive agent, an insecticide, an herbicide, a cosmetic agent, a sealant, a cleaning fluid, an adhesive, an absorptive material, a lubricant, an electrolyte, an energetic material, a dye, a fluorescent material, a chemical indicator, a flammable material, a flame retardant, and any combination thereof.

According to some embodiments of the invention, the organic solvent is selected from the group consisting of an alkane, an alkene, an alkyne, a haloalkane, an alkyl ether, an aryl ether, a cycloalkane, an aryl, a haloaryl, a heteroaryl and any combination thereof.

According to some embodiments of the invention, the organic solvent is cyclohexane, octadecane, toluene, naphthalene, 1,4-dichlorobenzene, and any combination thereof.

According to some embodiments of the invention, the hydrophobic monomer is substantially immiscible in an aqueous media and the hydrophilic monomer is substantially immiscible in an organic media.

According to some embodiments of the invention, the hydrophilic monomer is selected from the group consisting of a polysaccharide, a polyphenol, a glycoprotein, a polypeptide, a flavonoid, a glucoside, an aminoglucoside, a lignin and any combination thereof.

According to some embodiments of the invention, the polysaccharide is selected from the group consisting of alginate, chitosan, dextran, pectin, and any combination thereof.

According to some embodiments of the invention, the polyphenol is selected from the group consisting of tannic acid, humic acid, and any combination thereof.

According to some embodiments of the invention, the hydrophobic monomer is selected from the group consisting of a diisocyanate, a triisocyanate, a polyisocyanate, a diacylhalide, a triacylhalide, a polyacylhalide and any combination thereof.

According to some embodiments of the invention, the polymer is devoid of an emulsion stabilizer that is not a monomer, or devoid of a non-reactive emulsion stabilizer.

According to some embodiments of the invention, the polymer is devoid of a surfactant that is not a monomer. According to some embodiments of the invention, the polymer is devoid of emulsion stabilizing solid particles. According to some embodiments of the invention, the polymer is devoid of a surfactant that is not a monomer and devoid of emulsion stabilizing solid particles.

According to some embodiments of the invention, the polymer further includes an emulsion stabilizer, or the polymer further includes a non-reactive emulsion stabilizer. According to some embodiments of the invention, the polymer further includes an emulsion stabilizer which is also a reactive monomer.

According to some embodiments of the invention, the emulsion stabilizer is a surfactant, an emulsifier or a plurality of solid particles.

According to some embodiments of the invention, the surfactant is selected from the group consisting of a poloxamer, an alkylphenol hydroxypolyethylene, a polyethoxylated sorbitan ester, a Span® surfactant, a Tween® surfactant, a Hypermer™ surfactant, sorbitan monooleate (SMO), sorbitan monolaurate (SML) and olyglycerol polyricinoleate (PGPR).

According to some embodiments of the invention, the surfactant is selected from the group consisting of Poloxamer 407, Pluronic P-123, Triton X-405, Triton X-100, Triton X-705 and Tween 20.

According to an aspect of some embodiments of the present invention there is provided a process of preparing the composition-of-matter presented herein, the process includes:

providing an organic solution that includes at least one hydrophobic monomer;

providing an aqueous solution that includes at least one hydrophilic monomer;

mixing the organic solution to the aqueous solution under stirring to thereby obtaining a HIPE; and allowing the HIPE to polymerize, thereby obtaining the composition-of-matter.

According to some embodiments of the invention, the process further includes, subsequent to obtaining the HIPE, adding a polymerization catalyst to the HIPE.

According to some embodiments of the invention, the aqueous solution and/or the organic solution further includes an emulsion stabilizer.

According to some embodiments, the HIPE is a water-in-oil HIPE or an oil-in-water HIPE.

According to some embodiments, the HIPE is an oil-in-water HIPE and the concentration of the hydrophobic monomer ranges from 0.01 to 90 weight percent of the total weight of the HIPE.

According to some embodiments of the invention, the HIPE is an oil-in-water HIPE and the concentration of the hydrophilic monomer ranges from 0.01 to 40 weight percent of the total weight of the HIPE.

According to some embodiments, the HIPE is a water-in-oil HIPE and a concentration of the hydrophobic monomer ranges from 0.01 to 40 weight percent of the total weight of the HIPE.

According to some embodiments, the HIPE is a water-in-oil HIPE and a concentration of the hydrophilic monomer ranges from 0.01 to 90 weight percent of the total weight of the HIPE.

According to an aspect of some embodiments of the present invention, there is provided a composition-of-matter that includes a polymer, with the polymer's main chain includes residues of at least one hydrophobic monomer and/or residues of a product of a reaction of the hydrophobic monomer with water, having a microstructure of a polymerized high internal phase emulsion (HIPE).

According to some embodiments of this aspect, the HIPE is a water-in-oil HIPE or an oil-in-water HIPE.

According to some embodiments of this aspect, the composition-of-matter has a closed-cell microstructure, a quasi-closed cell microstructure or an open-cell microstructure.

According to some embodiments of this aspect, the HIPE is a water-in-oil HIPE and the composition-of-matter has a closed-cell microstructure and further includes an aqueous composition encapsulated therein.

According to some embodiments of this aspect, the encapsulated aqueous composition is releasable.

According to some embodiments of this aspect, the HIPE is an oil-in-water HIPE and the composition-of-matter has a closed-cell microstructure and further includes an organic composition encapsulated therein.

According to some embodiments of this aspect, the encapsulated organic composition is releasable.

According to some embodiments of this aspect, the hydrophobic monomer is selected from the group consisting of a diisocyanate, a triisocyanate, a polyisocyanate, a diacylhalide, a triacylhalide, a polyacylhalide and any combination thereof.

According to some embodiments of this aspect, the external phase further includes an emulsion stabilizer. According to some embodiments of this aspect, the internal phase further includes an emulsion stabilizer. According to some embodiments of this aspect, the external phase and the internal phase further includes an emulsion stabilizer.

According to some embodiments of this aspect, the emulsion stabilizer is a surfactant, an emulsifier or a plurality of solid particles.

According to some embodiments of this aspect, the surfactant is selected from the group consisting of a poloxamer, an alkylphenol hydroxypolyethylene, a polyethoxylated sorbitan ester, a Span® surfactant, a Tween® surfactant, a Hypermer™ surfactant, sorbitan monooleate (SMO), sorbitan monolaurate (SML) and olyglycerol polyricinoleate (PGPR).

According to an aspect of some embodiments of the present invention, there is provided a process of preparing the composition-of-matter that includes:

providing an organic solution that comprises the at least one hydrophobic monomer;

providing an aqueous solution;

mixing the organic solution with the aqueous solution under stirring to thereby obtaining a HIPE; and allowing the HIPE to polymerize, thereby obtaining the composition-of-matter.

According to some embodiments of this aspect, the process further includes, subsequent to obtaining the HIPE, adding a polymerization catalyst to the HIPE.

According to some embodiments of this aspect, the aqueous solution and/or the organic solution further includes an emulsion stabilizer.

According to some embodiments of this aspect, the HIPE is a water-in-oil HIPE or an oil-in-water HIPE.

According to an aspect of some embodiments of the present invention there is provided an article of manufacturing that includes any of the compositions-of-matter presented herein.

According to some embodiments of the invention, the article of manufacturing is selected from the group consisting of a fire-retardant device, a chemical detector device, a fragrance carrier and releasing device, an adhesive carrier and releasing device, a cosmetic carrier and releasing device, an energy storage device, an absorptive device, an explosive device, an energy absorbing device, an insecticide carrier and releasing device, a herbicide carrier and releasing device, a drug delivery device, a coloration device, a cleaning device, a sealing device, an ignition device, an incendiary device, a coating device, an insulating device, an anti-corrosion device, a nutrition device, a toxin carrier and releasing device and a lubrication carrier and releasing device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrase "substantially devoid of" or "essentially devoid of" a certain substance refers to a composition that is totally devoid of this substance or includes no more than about 1, 0.5 or 0.1 percent of the substance by weight or volume.

The term "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

It is expected that during the life of a patent maturing from this application many relevant polyHIPE structures made by step-growth interfacial polymerization will be developed and the scope of the phrase "polyHIPE structures made by step-growth interfacial polymerization" is intended to include all such new technologies a priori.

BRIEF DESCRIPTION OF THE SEVERAL VIEWS OF THE DRAWINGS

Some embodiments of the invention are herein described, by way of example only, with reference to the accompanying drawings or images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 3A-D are electron-micrographs of the samples of exemplary compositions-of-matter having open-cell microstructures, according to some embodiments of the present invention, which were dried for 72 hours in a vacuum, wherein FIG. 3A is of sample CHI-L, 3B is of sample ALG-L, 3C is of sample PEC-L, and 3D is of sample CHI-M, the recipes of which are presented in Table 2 presented below;

FIGS. 4A-C are electron-micrographs of the samples of exemplary compositions-of-matter having quasi-closed-cell microstructures, according to some embodiments of the present invention, which were dried for 72 hours in a vacuum, wherein FIG. 4A is of sample PEC-M, FIG. 4B is of sample DEX-M, and FIG. 4C is of sample CHI-H, the recipes of which are presented in Table 2 presented below;

FIGS. 5A-L are electron-micrographs of the samples of exemplary compositions-of-matter some of which have truly closed-cell microstructures, according to some embodiments of the present invention, at two magnifications, wherein FIGS. 5A-B are of sample No. 65, FIGS. 5C-D are of sample No. 72, FIGS. 5E-F are of sample No. 73, FIGS. 5G-H are of sample No. 74, FIGS. 5I-J are of sample No. 75, and FIGS. 5K-L are of sample No. 76;

DESCRIPTION OF SPECIFIC EMBODIMENTS OF THE INVENTION

Figure 1:
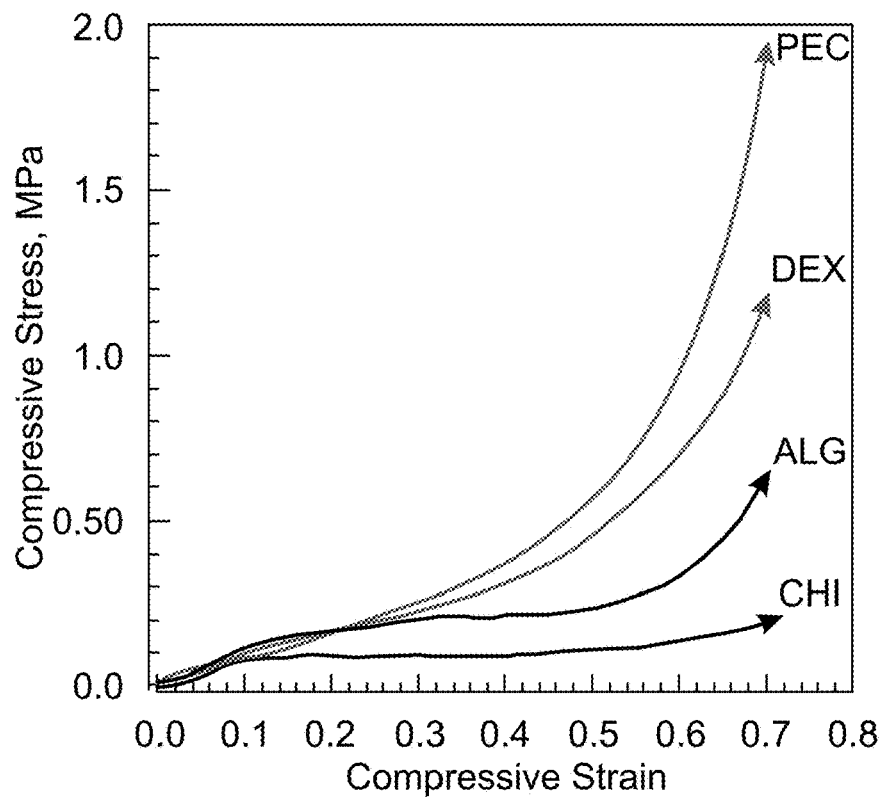
FIG. 1 presents a comparative compressive stress-strain curve obtained from the samples presented in Table 1.

The present invention, in some embodiments thereof, relates to material science, and more particularly, but not exclusively, to step-growth polymerization polyHIPE structures and uses thereof.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed hereinabove, polyHIPEs whose polymers comprise residues of monomers dissolved in the aqueous phase (hydrophilic monomers) and residues of monomers dissolved in the organic phase (hydrophobic monomers) obtained by step-growth polymerization have not been realized. A step-growth polymerization in which polymerization occurs at an interface between an aqueous solution containing one monomer and an organic solution containing a second monomer, is typically limited in its progression since the polymer is formed as a film at or near the liquid-liquid interface when the two solutions are brought into contact. The formation of the polymer film at the interface becomes a barrier that slows the reaction as the polymerization reaction proceeds. When step-growth polymerization is used in interfacial polymerization conditions, removal of the polymer film generates fresh interface for further reaction; however, this practice cannot be employed with forming a polyHIPE under these conditions. While studying the conditions that can afford such polyHIPEs by interfacial polymerization, the present inventors have surprisingly found that certain monomers can afford open-, quasi-closed and closed-cell polyHIPEs by interfacial step-growth polymerization, having a wide range of mechanical properties that can be used for a variety of applications. It would be reasonable to expect not to afford polyHIPEs from step-growth interfacial polymerization, and even less so to afford open-cell microstructured polyHIPEs, since step-growth interfacial polymerization occurs only at a two-dimensional plane where the two phases interface, each being the reservoir for one type of monomer (hydrophilic or hydrophobic), and produces a thin polymeric film that should be removed continuously if the reaction is to progress to completion. It would have been reasonable to expect that no matter how convex or concave this thin film is, it would not form a three-dimensional entity such as a polyHIPE that has bulky walls that are thicker that a film. Moreover, if any polymerization is to take place under step-growth interfacial polymerization in a HIPE, one would expect to obtain a plurality of individual substantially spheroidal liquid-filled capsules resulting from the internal phase droplets being entrapped in a substantially spheroidal polymeric crust, rather than a monolithic porous polymer, referred to as having an open-cell microstructure. For the same reasons, obtaining a monolithic polymer having droplets of liquid entrapped therein, referred to as having a closed-cell microstructure, is also surprising.

While reducing the invention to practice, the present inventors have succeeded in forming a stable oil-in-water or water-in-oil HIPE that can be polymerized by a step-growth mechanism, made primarily from alternating hydrophilic and hydrophobic monomers that can also stabilize a HIPE during the polymerization process. The newly formed polyHIPE compositions-of-matter exhibited open- or closed-cell microstructures, depending on the composition of the phases in the HIPE. The newly formed closed-cell polyHIPE composition-of-matter presented herein also exhibited a capacity to encapsulate the dispersed (oil) phase for extended periods of time, as measured by mass loss under drying (vacuum) conditions.

HIPE-Templated Polymeric Compositions-of-Matter:

According to an aspect of some embodiments of the present invention, there is provided a polymeric composition-of-matter having a microstructure of a polymerized external phase of a high internal phase emulsion (HIPE). By being polymeric, it is meant that the composition-of-matter includes a polymer having the shape and microstructure of a HIPE, or in short, the composition-of-matter comprises a polyHIPE. By having a microstructure of a polyHIPE, it is meant that the microstructure of the composition-of-matter presented herein results from a polymerization process that occurs within a HIPE.

The compositions-of-matter presented herein are HIPE-templated, namely their microstructure is substantially a projection of the microstructure of a HIPE before and after its polymerization. Briefly, a HIPE is a plurality of tightly-packed substantially spheroidal droplets of various sizes, constituting the dispersed phase, separated by walls of a liquid constituting the continuous phase. The average size and size distribution of the droplets is controlled by the chemical composition and mechanical treatment of the emulsion phases, and are typically characterized by a population of one or more narrowly distributed sizes. For example, average droplet size and distribution can be controlled by use of emulsion stabilizers (surfactants; surface-active substances, solid particles etc.), which may act to reduce the tendency of the droplets to coalesce.

The term "polyHIPE" can therefore be used as a structural term to describe a highly porous monolithic structure of thin walls separating a collection of tightly-packed voids. The walls are typically thinner at the closest distance between what was tightly-packed droplets before polymerization, and thicker at the spaces between adjacent droplets. When a HIPE is polymerized to yield a polyHIPE, the same microstructure is substantially preserved.

Unlike polymerized foams, which are polymeric structures templated by a mass of bubbles afforded by using a blowing agent and a polymerizable liquid, polyHIPEs are templated by an emulsion, resulting in a microstructure that is easily distinguishable from that of a foam. Hence the term "HIPE-templated" is a structural term rather than a process-related term, since it relates the microstructure of the HIPE to the microstructure of the resulting monolithic polymeric composition-of-matter, which is no longer an emulsion but a solid matter comprising a polyHIPE.

In some instances, the thinnest areas some of the walls give way to interconnecting windows connecting adjacent droplets, thereby forming an open-cell microstructure. In the case of open-cell polyHIPEs, when the polyHIPE is dried and the dispersed phase is removed, the droplets leave voids in their place, which are interconnected by the windows in the walls, wherein the voids can be referred to as having an open-cell microstructure. Some type of voids, sometimes referred to as "craters", may stem from gases released in the polymerization process (e.g., $CO_2$).

According to some embodiments of the present invention, the microstructure of the polymeric compositions-of-matter is structurally-templated by an oil-in-water high internal phase emulsion, or by a water-in-oil HIPE. In an oil-in-water HIPE the polymerization reaction entraps the organic dispersed internal phase, while the polymerized walls serve for the encapsulation thereof. In a water-in-oil HIPE the polymerization reaction entraps the dispersed aqueous internal phase, while the polymerized walls serve for the encapsulation thereof.

In the context of embodiments of the present invention, the phrase "HIPE-templated monolithic polymeric composition-of-matter", is used herein to refer to the presently provided and claimed macroscopic entities, which are characterized by being formed from a polymer comprising alternating residues of at least one hydrophilic monomer and at least one hydrophobic monomer, and having an open-cell porous microstructure projected by its structural precursor being a high internal phase emulsion (HIPE), or having a closed-cell encapsulated droplets microstructure projected by the HIPE, as this aspect is discussed hereinbelow. The mechanical properties of the composition-of-matter are derived from its structural, mechanical and chemical composition. The phrase "HIPE-templated monolithic polymeric composition-of-matter" is used herein interchangeably with the shortened phrases "polymeric composition-of-matter", "monolithic composition-of-matter", "HIPE-templated composition-of-matter", or "composition-of-matter".

Closed-Cell Microstructure:

The composition-of-matter presented herein can be designed to have an open-cell microstructure, being essentially a porous material or a foam, a quasi-closed-cell microstructure, characterized by mechanical properties that resemble a non-open-cell material but is still a foam having ambient gas filling its interconnected voids, and a closed-cell microstructure, sometimes referred to as a true or truly-closed-cell microstructure, wherein the voids in the polymer, or at least a part thereof, are substantially not interconnected and the contents of which is not easily removed.

According to some embodiments, the composition-of-matter is characterized by a closed-cell microstructure stemming from polymerization of an oil-in-water HIPE, wherein an organic composition, which is the remainder of the dispersed organic phase, is encapsulated in the closed-cell microstructure. The organic composition is therefore the non-reactive and/or excess reactants part of the dispersed organic phase left after the polymerization took place.

According to some embodiments, the composition-of-matter is characterized by a closed-cell microstructure stemming from polymerization of a water-in-oil HIPE, wherein an aqueous composition, which is the remainder of the dispersed aqueous phase, is encapsulated in the closed-cell microstructure. The aqueous composition is therefore the non-reactive and/or excess reactants part of the dispersed aqueous phase left after the polymerization took place.

In some instances, the continuous walls of the HIPE are preserved intact throughout the polymerization process, thereby forming a closed-cell microstructure. In the case of closed-cell polyHIPE, when the polyHIPE is dried, the dispersed phase or the remainder thereof, cannot be easily removed as the droplets are entrapped in the voids. The definition of a closed-cell polyHIPE microstructure is therefore one that involves an initial mass of the composition-of-matter and the rate of a change in that mass over a period of time during which the composition is subjected to conditions that are conducive of drying the entrapped phase.

A closed-cell polyHIPE has the capacity to encapsulate the internal (dispersed) phase entrapped in the voids surrounded by the polymeric walls. As discussed hereinabove, visual inspection of the microstructure of the polyHIPE under an electron microscope may be misleading as to the imperviousness of the walls to the encapsulated medium; therefore, a closed-cell microstructure may be determined based on the period of time during which a given composition-of-matter loses a significant amount of mass.

The mass of the entrapped internal phase can be assessed, based on the amount of the internal phase prior to the polymerization step, however, in some embodiments the internal phase is made primarily of a volatile solvent which can evaporate to some extent during the HIPE formation and polymerization. Thus, according to some embodiments of the present invention, the composition-of-matter presented herein is considered as having a closed-cell microstructure when it is exposed to vacuum at room temperature and loses less than 50% of its mass over a time period of 7 days. In some embodiments, the desiccating vacuum is lower than 1 atm, typically 0.5-0.05 atm or less.

In some embodiments of the present invention, the organic or aqueous composition entrapped in the closed-cell microstructure of the composition-of-matter presented herein, can be released from the encapsulating polymer. The release of the releasably encapsulated organic or aqueous composition, can be effected by compromising the integrity of the encapsulating polymeric walls. Once the encapsulating polymeric walls are fractured, broken, dissolved or otherwise lose their capacity as a physical barrier to the encapsulated composition, the organic or aqueous composition is no longer entrapped. For example, if the encapsulating polymeric walls are made of a brittle or non-ductile polymer, the walls will fracture upon applying, e.g., a compressive strain to the composition-of-matter, thereby releasing the encapsulated organic or aqueous composition that was entrapped therein.

Polymer:

According to embodiments of the present invention, the polymer is made of alternating residues of at least one hydrophilic monomer and at least one hydrophobic monomer. The term "polymer", as used herein, also encompasses a copolymer. The polymer of the composition-of-matter presented herein is formed from two types of monomers, a hydrophobic monomer and a hydrophilic monomer, in a polymerization process known as step-growth polymerization, as opposed to chain growth polymerization, as these are known in the art. Interfacial polymerization, as this term in known in the art, is a type of step-growth polymerization in which polymerization occurs at the interface between an aqueous phase (solution) containing the hydrophilic monomer, and an organic phase (solution) containing the hydrophobic monomer. It is noted herein that interfacial polymerization is fundamentally different from interfacial initiation of polymerization; in interfacial polymerization the entire polymerization process takes place only at the biphasic system interface since no one phase contains both the reacting step-growth monomers, whereas in interfacial initiation of polymerization only the radical initiation takes place at the interface while the chain-growth process takes place in the bulk of the phases that contain the monomers. In the context of embodiments of the present invention, the term "interfacial polymerization" encompasses "interfacial polycondensation", which is a class of interfacial reaction that generates a secondary byproduct molecule such as water, methanol, acetic acid, $CO_2$ or HCl during the reaction.

It is noted herein that most interfacial polymerization processes are based on the continuous removal of the freshly formed polymer, since the polymer is typically a film that forms at the interface of the solutions, and can prevent the two types of monomers on its opposite sides from coming in contact and reacting to form more polymer. Thus, accomplishing a polyHIPE from a polymer that is generated at the interface of the HIPE's phases is not trivial and not expected to proceed to completions, particularly from the microstructural sense—open-cell being the least expected.

Polymers that can be formed by interfacial polymerization include the families of poly(urethane urea)s, polyurethanes, polyamides, polyesters, polysulfonamides and polycarbonates. As known in the art, step-growth polymerization (and thus interfacial polymerization) affords a polymer wherein the two types of monomers alternate along the polymeric chain, namely each type of monomer is bound to the other type of monomer, and not directly to another monomer of its own type.

Step-growth polymerization of polyamides is afforded by reacting a polyamine monomer (a compound having at least two amine functional groups) with a polycarboxylic acid monomer (a compound having at least two carboxyl functional groups), or a poly(acyl halide) monomer (a compound having at least two acyl halide groups). Step-growth polymerization of polyesters is afforded by reacting a polyol or polysaccharide monomer (a compound having at least two hydroxyl functional groups) with a polycarboxylic acid monomer. Step-growth polymerization of polyurethanes is afforded by reacting a polyisocyanate (a compound having at least two isocyanate functional groups) with a polyol. Step-growth polymerization of poly(urethane urea)s is afforded by reacting a polyisocyanate with a polyol, and with either water and/or an amine/polyamine compound. Step-growth polymerization of polysulfonamides is afforded by reacting a polysulfonyl monomer (a compound having at least two sulfonyl functional groups) with a polyamine monomer. Step-growth polymerization of polycarbonates is afforded by reacting a polyol/polyphenol (a compound having at least two hydroxyl functional groups) with phosgene ($Cl_2CO$) or through transesterification with a carbonate.

It is noted herein that common radical polymerization that is initiated at the interface of two phases, involves radical copolymerization between monomers in the aqueous phase and monomers in the organic phase. In such radical polymerization, as known in the art, the type of copolymer formation depends on kinetics of polymerization, relative reactivity of monomers, and monomers' concentration. Therefore, when monomer A in one phase and monomer B in the other, it is expected to receive chains with random placements of A and B monomers that are influenced by the above stated factors—monomer A can react with monomer A, B can react with B, A can react with B, and B can react with A. While the reaction between the free radical of the initiator and the first monomer that begins the polymerization occurs at the interface, the rest of the polymerization can take place in one phase. Unlike the above described radical polymerization, the presently provided polymers are synthesized by interfacial step-growth polymerization. In step-growth polymerization between A-A and B-B monomers (bi-functional monomers having at least two similar functionalities), which is completely different from radical polymerization, A-A can only react with B-B and B-B can only react with A-A. In interfacial step-growth polymerization, a special case of step-growth polymerization, A-A is in one phase and B-B is in the other phase and the reaction can only occur in the interphase. In some embodiments presented herein, each isocyanate group in the organic phase undergoes a reaction with one of the components in the aqueous phase (e.g., water, tannic acid, sodium alginate) in order for the polymerization to proceed.

Some step-growth reactions may occurs between two different bi-functional monomers in the external phase, however, this reaction is not an interfacial step-growth polymerization. In some embodiments, while there is some reaction between the isocyanates in the external phase and the water at the interface, the reaction that is integral to these materials is that between the two components on opposite sides of the phase interface.

As can be reckoned, for each of the abovementioned polymers to be formed by interfacial polymerization, one may select one type of monomers as hydrophilic monomers and the corresponding type of monomers as hydrophobic monomers.

At least one of the hydrophobic or hydrophilic monomers can be selected to be of a natural origin (naturally occurring), thereby increases the possibility that the polymer be degradable, or biodegradable. In such embodiments wherein at least one of the hydrophobic or hydrophilic monomers is a naturally occurring compound, the polymer is regarded as being formed from renewable resource(s).

In some embodiments of the present invention, the polymer is a poly(urethane urea) or PUU. Polyureas are produced, for example, by a reaction of diisocyanates with water or with amine-containing molecules, while the reaction with water produces $CO_2$ as a by-product. The amine group that results from the reaction of an isocyanate group with water, can further react with an isocyanate to form a urea group. Thus two diisocyanate monomers may be connected via a urea group that contains atoms from the reaction with water. Thus, a hydrophobic diisocyanate monomer reacts with water to form the amine group that contains a residue of the water molecule, before it can react with another hydrophobic diisocyanate, such that the residues of two hydrophobic monomers are separated by the urea group, generated following the reaction of the first hydrophobic monomer with water. Hence, according to some embodiments of the present invention, considering the alternating hydrophilic-hydrophobic residues in the main-chain structure of the polymer, these oligomeric urea-containing species, resulting from the reaction of hydrophobic diisocyanate monomers with water, are also regarded as hydrophobic monomers, the residues of which alternate with residues of hydrophilic monomers in the polymer's structure.

In some embodiments of the present invention, the polymer is a poly(urethane urea) afforded by interfacial polymerization of a hydrophobic polyisocyanate or a hydrophobic diisocyanate and a naturally occurring hydrophilic polyol or polysaccharide.

Hydrophilic Monomers:

In the context of embodiments of the present invention, the term "hydrophilic monomer" refers to a compound that in a biphasic system of an aqueous media and an organic media, will be present substantially in the aqueous phase and be essentially absent from the organic phase, or found there in relatively low or negligible amounts. This definition applies to all types of immiscible biphasic systems based on water and another water-immiscible solvent, which includes but not limited to organic solvents and/or non-polar solvents. Alternatively, the term "hydrophilic monomer" as used herein, refers to a compound that is miscible in water and other aqueous media (at least 2% or at least 5% by weight in water), and substantially immiscible in organic media (less than 1% or less than 0.1% by weight in an organic solvent such as cyclohexane).

According to embodiments of the present invention, a hydrophilic monomer is a compound that can undergo interfacial polymerization in a biphasic system with a hydrophobic monomer in the organic phase. Therefore, a hydrophilic monomer is also characterized by at least two functional groups, each of which can react with a corresponding functional group in the hydrophobic monomer to form a covalent bond. Suitable functional groups in a hydrophilic monomer, according to some embodiments of the present invention, include, without limitation, hydroxyl (—OH), carboxyl (—COOH), amine (—NH$_2$, —NHR), aldehyde (—CHO), acyl chloride (—COCl) and amide (—CONH$_2$).

Exemplary families of hydrophilic monomers, according to some embodiments of the present invention, include but not limited to polysaccharides, polyphenols, flavonoids, glucosides, aminoglucosides, lignins and polypepdites.

According to some embodiments, the hydrophilic monomer is also an emulsion stabilizing agent (emulsion stabilizer), such that it has the capacity to stabilize a HIPE when present in the aqueous phase. For example, although typical polysaccharides, poly(vinyl alcohol)s and polyols do not bear the molecular functionalities associated with surfactants, namely a hydrophilic head and a long hydrophobic tail, such compounds were found to serve as HIPE stabilizers when acting in tandem with other molecules (see, Examples section below).

In some embodiments of the present invention, the hydrophilic monomer has more than two functional groups that can react with a corresponding functional group in the hydrophobic monomer, such that the resulting polymer is crosslinked by virtue of the multiple chains that can form from each hydrophilic monomer, acting also as a crosslinking agent.

In some embodiments, the hydrophilic monomer has a molecular weight that is greater than 200, 300, 400 or 500 grams/mol.

According to some embodiments, the hydrophilic monomer is a naturally occurring compound, namely can be found in nature without artificial aid and can be extracted with minimal chemical alteration and processing.

Polysaccharides are polymeric carbohydrate molecules composed of chains of monosaccharide units bound together by glycosidic linkages. Polysaccharides are an important class of biological polymers, and their function in living organisms is usually either structure-related or storage-related. Exemplary polysaccharides which are also naturally occurring and listed alphabetically, include, without limitation, agarose, alfa mannan degradation, alginate (alginic acid), alguronic acid, alpha glucan, alpha-cyclodextrin, amylopectin, amylose, arabinoxylan, beta-glucan, callose, capsulan, carrageenan, cellodextrin, cellulin, cellulose, chicle gum, chitin, chitin nanofibril, chitin-glucan complex, chitosan, chrysolaminarin, curdlan, cycloamylose, cyclodextrin, dammar gum, dextran, dextrin, ficoll, fructan, fucoidan, galactoglucomannan, galactomannan, galactosaminogalactan, gellan gum, glucan, glucomannan, glucomannan, glucuronoxylan, glycogen, guar gum, gum arabic, gum ghatti, gum tragacanth, hemicellulose, homopolysaccharide, hypromellose, icodextrin, inulin, karaya gum, kefiran, laminarin, lentinan, levan polysaccharide, lichenin, locust bean gum, mannan, mastic gum, matrixdb, mixed-linkage glucan, mucilage, oat beta-glucan, oxidized cellulose, paramylon, pectic acid, pectin, pentastarch, phytoglycogen, pleuran, poligeenan, polydextrose, polysaccharide peptide, porphyran, pullulan, root mucilage, schizophyllan, selective relaxant binding agent, sepharose, sinistrin, sizofiran, sugammadex, tara gum, welan gum, xanthan gum, xylan, xyloglucan and zymosan.

Exemplary polyphenols which are also naturally occurring and listed in declining molecular mass going from about 4,000 to about 300 grams/mol, include, without limitation, lambertianin D, lambertianin C, raspberry ellagitannin, sanguiin h-6, cornusiin E, roburin A, tannic acid, humic acid, chunganenol, mallojaponin, punicalagin alpha, acutissimin A, violdelphin, amurensin E, mallotusinic acid, bicornin, punicalagin, grandinin, chebulinic acid, chebulagic acid, granatin B, pentagalloyl glucose, tellimagrandin ii, casuarictin, stenophyllanin A, castalagin, kobophenol A, amurensin K, carthamin, vitisin A, prodelphinidin c2, theaflavin digallate, proanthocyanidin C1, cinnamtannin b1, foeniculoside I, selligueain A, malvidin glucoside-ethyl-catechin, punigluconin, echinacoside, pedunculagin, punicalin, xanthorhamnin, eleutheroside D, troxerutin, CTN-986, dieckol, robinin, theaflavin-3-gallate, secoisolariciresinol diglucoside, trans-diptoindonesin B, tangshenoside I, alpha-viniferin, norbadione A, icariin, malvin, 3,4,5-tri-o-galloylquinic acid, malvidin-3-o-(6-p-coumaroyl)glucoside, gallagic acid, actinorhodin, punicacortein A, castalin, myricetin 3-o-rutinoside, pinotin A, verbascoside, taxillusin, compound nj2, diptoindonesin A, balanophotannin D, neohesperidin dihydrochalcone, tulipanin, delphinidin 3-(6-p-coumaroyl)glucoside, hesperidin, rutin, epigallocatechin 3,5-digallate, diosmin, phlorofucofuroeckol A, pelargonin, poncirin, kaempferol 3-o-rutinoside, prodelphinidin b3, ouabain, naringin dihydrochalcone, naringin, kaempferitrin, b type proanthocyanidins, proanthocyanidin a1, viniferal, mulberroside A, castavinol c3, apiin, theaflavin, vitisin A, geranin A, theograndin I, oleuropein, amentoflavone, amurensin (flavonol), oxovitisin A, phellamurin, cynarine, rottlerin, mallotojaponin B/C, aviculin, sanguisorbic acid, phylloflavan, tetraphlorethol C, 7-phloroethol, oenin, eupatolin, globoidnan A, 1-o,6-o-digalloyl-beta-d-glucose, 2,3-(s)-hexahydroxydiphenoyl-d-glucose, petunidin-3-o-glucoside, miquelianin, eupalin, amurensin A, ampelopsin A, valoneic acid dilactone, gyrophoric acid, curculigoside A, hyperoside, myrtilin, diffutin, isoquercitin, peonidin 3-O-glucoside, scutellarin, sophoradin, oroxindin, mallotojaponin B, epigallocatechin gallate, flavogallonic acid, steganacin, epsilon-viniferin, flavogallonic acid dilactone, aspalathin, cinchonain-ib, astilbin, chrysanthemin, sakuranin, knipholone, astragalin, desaspidin, baicalin, mallotochromene, epicatechin gallate, polyozellin, phlorizin, engeletin, avicularin, callistephin, apigetrin, ononin, durantin A, quebecol, riccardin C, mangiferin, glycyrrhizol, ascofuranone, rhaponticin, syringaresinol, aloin, juglanin, aleuritin, mangostin, astringin, mallotophenone, brickellin, habenariol, piceid, combretol, diferulic acids, chrysosplenetin, fucophlorethol A, arctigenin, sinensetin, eckol, sesamolin, eckstolonol, curcumin, gmelanone, centaureidin, matairesinol, retusin, myricanone, balanophonin, chebulic acid, xanthohumol, carpanone, chlorogenic acid, dehydrohexahydroxydiphenic acid, asterric acid, dihydrokanakugiol, scillavone B, eupatolitin, capensinidin, 3,4-divanillyltetrahydrofuran, ayanin, theogallin, coniferin, zapotin, 8-prenylnaringenin, aesculin, bergamottin, glyceollin III, hexahydroxydiphenic acid, gastrol, alpinumisoflavone, dactylifric acid, combretastatin B1, karanjachromene, barceloneic acid B, combretastatin A1, koaburaside, glucogallin, 5-o-methylmyricetin, malvidin, carnosol, ombuin, macelignan, rhododendrin, salvigenin, bergenin, acutifolin A, p-coumaric acid glucoside, fertaric acid, glabridin, atrometin, phaseolin (pterocarpan), leucopeonidin, leucodelphinidin, digallic acid, ampelopsin, luteic acid, bilobol, myricetin, petunidin, combretastatin A4, ferujol, isorhamnetin, rosinidin, flavokavain A, ermanin, norbergenin, caftaric acid, monocerin, 2,4-bis(4-hydroxybenzyl) phenol, epigallocatechin, oleocanthal, meciadanol, dihydromorin, 6-hydroxycyanidin, enterodiol, diffutidin, dihydrokaempferide, quercetin, ellagic acid, peonidin, genistein and cyanidin.

It is noted that any one hydrophilic monomer can be a member of more than one family of hydrophilic monomers.

The amount (concentration) of the hydrophilic monomer (s) in polymer can be controlled at the HIPE forming stage, thus, according to some embodiments of the present invention, the concentration of the hydrophilic monomer ranges from 0.01 to 40 weight percent of the total weight of said HIPE. It is noted that in some embodiments, the most or all of the external aqueous phase is water, which reacts with the hydrophobic monomer(s) in the internal organic phase en route to forming a polymer, as discussed hereinabove and exemplified in Scheme 1 hereinbelow. In some embodiments, the concentration of the hydrophilic monomer is about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 25, 30, 35 or 40 weight percent of the total weight of said HIPE.

Water as a Hydrophilic Reactant:

In the context of some embodiments of the present invention, water molecules take a role in some of the polymerization reactions. Hence, water is one of the reactants in the polymerization process, as exemplified by interfacial step-growth polymerization of polyurea from a hydrophobic isocyanate monomers and water. In some embodiments, a composition-of-matter according to the present invention, can be formed from water in the external or internal phase and a hydrophobic monomer in the other phase, without the presence of a hydrophilic monomer. In these embodiments, by being a reactant in an interfacial step-growth polymerization reaction, water is used to transform some of the hydrophobic monomers into species that can polymerize therebetween, which leads to the formation of a composition-of-matter having a microstructure of a polyHIPE, wherein the main-chain of the polymer comprises hydrophobic monomer residues and/or residues of the product of the reaction of water with the hydrophobic monomer. This polymerization reaction is still regarded interfacial, since water and the hydrophobic monomer can react only at the phase interface, and is still regarded as step-growth, since the water-modified hydrophobic monomers react with themselves and/or with the non-water-modified hydrophobic monomers in a step-growth manner. An example for such an embodiment is the interfacial step-growth polymerization reaction between a hydrophobic diisocyanate and water in a HIPE, leading to the formation of a polyurea polyHIPE, as illustrated in Scheme 1 below.

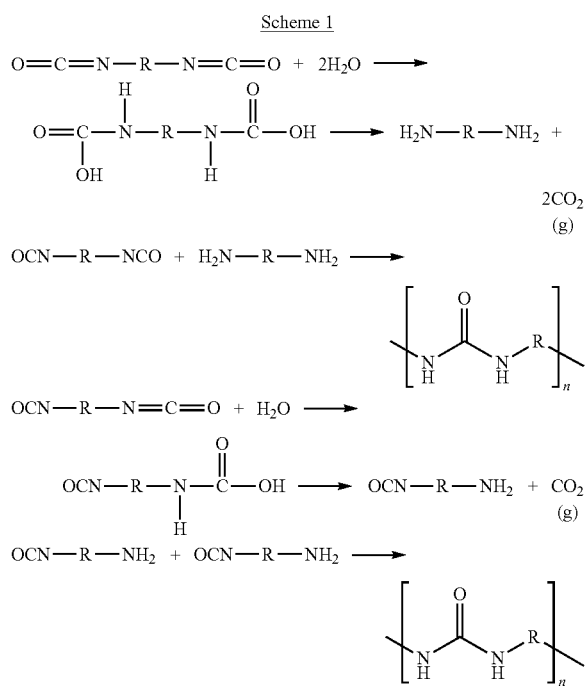

Scheme 1

Thus, according to an aspect of embodiments of the present invention, there is provided a composition-of-matter that is made of a polymer, the main chain of which includes residues of at least one hydrophobic monomer and/or residues of a product of a reaction of the hydrophobic monomer with water, and having a microstructure of a polymerized high internal phase emulsion (HIPE). The precursor HIPE can be a water-in-oil HIPE or an oil-in-water HIPE, and can have an open-, quasi-closed- or a closed-cell microstructure, as these terms are presented herein. The closed-cell embodiments of this aspect can entrap, also releasably, an organic composition in the case of an oil-in-water precursor HIPE, or an aqueous composition in the case of a water-in-oil precursor HIPE.

Hydrophobic Monomers:

In the context of embodiments of the present invention, the term "hydrophobic monomer" refers to a compound that in a biphasic system of an aqueous media and an organic media, will be present substantially in the organic phase and be essentially absent from the aqueous phase. Alternatively, the term "hydrophobic monomer" as used herein, refers to a compound that is miscible in organic media (more than 3% or more than 5% by weight in a solvent such as cyclohexane), preferably non-polar organic solvents, and substantially immiscible in water and other aqueous media (less than 1% or less than 0.1% by weight in water). The hydrophobic or hydrophilic nature of a molecule is oftentimes determined by its major moiety (side-chain, core or skeleton) rather than some functional groups thereon. Hence, it is noted that some hydrophobic monomers have functional groups that can react with water, and that the hydrophobic nature thereof stems from the major part of the monomer. For example, while a diisocyanate compound may react with water, at least in the sense of its isocyanate functionality, the compound itself may be hydrophobic in the sense that it is more soluble in organic solvents than in water.

According to some embodiments of the present invention, residues of dimeric, trimeric or oligomeric species resulting from a reaction of hydrophobic monomer(s) with water or other molecules, are regarded as the residues of a hydrophobic monomer alternating with the residues of the hydrophilic monomer(s) in the structure of the resulting polymer.

According to embodiments of the present invention, a hydrophobic monomer is a compound that can undergo interfacial polymerization in a biphasic system with a hydrophilic monomer in the aqueous phase. Therefore, a hydrophobic monomer is also characterized by at least two functional groups, each of which can react with a corresponding functional group in the hydrophilic monomer to form a covalent bond.

In some embodiments of the present invention, the hydrophobic monomer has more than two functional groups that can react with a corresponding functional group in the hydrophilic monomer, such that the resulting polymer is crosslinked by virtue of the multiple chains that can form from each hydrophobic monomer, acting also as a cross-linking agent.

Suitable functional groups in a hydrophobic monomer, according to some embodiments of the present invention, include, without limitation, isocyanate (—NCO), nitrile (—CN), epoxide (—COC—), alkene (—C═C—), alkyne (—C≡C—), hydroxyl (—OH), carboxyl (—COOH), amine (—NH$_2$, —NHR), aldehyde (—CHO), acyl chloride (—COCl) and amide (—CONH$_2$).

Exemplary families of hydrophobic monomers, according to some embodiments of the present invention, include but not limited to diisocyanates, triisocyanates polyisocyanates, diacyl chlorides, triacyl chlorides and poly(acyl chlorides).

Exemplary diisocyanates include, without limitation, hexamethylene diisocyanate (HDI), toluene diisocyanate, methylene diphenyl diisocyanate, hydrogenated methylene diphenyl diisocyanate (HMDI), tolylene 2,4-diisocyanate terminated poly(ethylene adipate), tolylene 2,4-diisocyanate terminated poly(propylene glycol), 1,3-bis(methylisocyanate)-cyclohexane, 1,4-bis(methylisocyanate)-cyclohexane, 1,4-cyclohexane diisocyanate, diethyldiisocyanatobenzene, 4,4'-diisocyanatodiphenyl ether, 2,4'-diisocyanatodiphenyl sulfide, 3,3'-dimethoxybenzidine-4,4'-diisocyanate, 3,3'-dimethyl-4,4'-diphenylene diisocyanate, 3,3'-dimethyldiphenylmethane-4,4'-diisocyanate, hexamethylene-1,6-diisocyanate, isophorone diisocyanate, 4-methyldiphenylmethane-3,4-diisocyanate, 1,1-methylenebis(4-isocyanatocyclohexane), methylene bis(phenylisocyanate), 1,5-naphthalene diisocyanate, 1,3-phenylene diisocyanate, 1,4-phenylene diisocyanate, polymeric diphenylmethane diisocyanate, 2,2,4-trimethylhexamethylene diisocyanate, L-lysine ethyl ester diisocyanate, L-lysine methyl ester diisocyanate and 2,4,4-trimethylhexamethylene diisocyanate.

Exemplary triisocyanates include HMDI isocyanurate trimer (Desmodur N3390), HDI biuret trimer (Desmodur N75) and other molecules, such as described, for example, in U.S. Pat. Nos. 4,045,462, 4,276,228, 4,314,048, 4,338,256, 4,603,189, 4,675,437 and 5,633,396.

The amount (concentration) of the hydrophobic monomer(s) in polymer can be controlled at the HIPE forming stage, thus, according to some embodiments of the present invention, the concentration of the hydrophobic monomer ranges from 0.01 to 90 or ranges from 0.01 to 95 weight percent of the total weight of said HIPE. In some embodiments, the most or all of the internal organic phase is the hydrophobic monomer(s) in a liquid or liquefied form. In some embodiments, the concentration of the hydrophobic monomer is about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 25, 30, 35, 40, 45, 50, 55, 60, 65, 70, 75, 80, 85, 90 or 95 weight percent of the total weight of said HIPE.

Mechanical Properties:

The mechanical properties of the composition-of-matter provided herein derives from the chemical composition and the microstructure of the polymer, as well as in some cases, the nature of the encapsulated organic or aqueous composition entrapped in the polymer.

Open-cell polyHIPEs generally exhibit compressive stress-strain curves typical of foams. These curves contain three distinct regions: a linear elastic stress-strain region at low strains from which the Young's modulus can be derived; a stress plateau region; a densification or crushing region exhibiting a rapid rise in stress. The modulus and the stress plateau decrease with decreasing density for the same wall material, reflecting the volumetric replacement of solid polymer with air. The modulus of polyHIPEs is also dependent upon the modulus of the wall material (the polymer).

Typical compressive stress-strain curves of quasi-closed-cell (capsule-like structures that can be dried within a week of desiccating conditions) and "true" closed-cell polyHIPEs differ from those of open-cell polyHIPEs essentially in the absence of a stress plateau, as the material that is entrapped in the polymer's voids cannot be displaced rapidly and/or easily. The voids of a quasi-closed-cell polyHIPE contain air after the non-reactive part of the organic phase has been removed. Without being bound by any particular theory, it seems that the rate of the displacement of air from the voids of a quasi-closed-cell polyHIPE is slower than the rate of compressing the sample's height, thus registration as resistance to the compression. The nature of the entrapped material governs the compressive stress-strain curve essentially according to its own compressive attributes. In the case of a condensed entrapped material, the compressive stress-strain curve will have a steep incline that could be broken at points of mechanical failure of the closed-cell polyHIPE. It has been observed by the present inventors, that some of the compositions-of-matter do not exhibit a break, although the ejection of the non-reactive part of the internal phase, and the flattening of the final sample, is similar.

The mechanical properties of the composition-of-matter presented herein, both open- and closed-cell type, depend on the mechanical properties of the polymer, which in turn depend on its chemical composition, namely the nature of the monomers it is made of. Mechanical properties of a polymer are typically referred to in terms of stress-strain relationships, such as the compressive strain at failure (compressive failure strain) or the ratio of stress to strain at low strains, known as the modulus of the polymer. The modulus of a stiff polymer far below its Tg (glass transition temperature) can be orders of magnitude larger than the modulus of a flexible elastomer far above its Tg.

In the context of embodiments of the present invention, the terms "failure" and "failing" is a mechanical term defined as a non-negligible decrease in stress with increasing strain or a discontinuity in the stress with increasing strain. In some cases, a discontinuity in the stress with increasing strain may be noticeable in a stress/strain plot as a sharp change in the trend of an otherwise smooth curve. A material could "fail" but such a failure might not be visually obvious or otherwise seen as macroscopic structural damage. In some cases, failure may be expressed visibly as breakage or cracks. It is noted that materials may undergo an irreversible deformation (plastic deformation) without exhibiting a brittle failure.

In some embodiments, the composition-of-matter having an open-cell microstructure is characterized by a compressive failure strain of at least 10% to more than 70%.

In some embodiments, the composition-of-matter having a closed-cell microstructure is characterized by a compressive failure strain of at least 10% to more than 70%.

In some embodiments, the composition-of-matter having an open-cell microstructure is characterized by a modulus of at least 500 Pa.

In some embodiments, the composition-of-matter having a closed-cell microstructure is characterized by a modulus of at least 500 Pa.

Density:

The density of the composition-of-matter presented herein depends whether the internal phase is entrapped (closed-cell) or free to dry, and also depends on the ratio of internal to external phase in the precursor HIPE. In the case of an open-cell microstructure, the higher the water and solvent contents in the HIPE, the less dense the resulting composition-of-matter is, as the volatile components are removed following polymerization.

According to some embodiments of the present invention, the mass of the external phase to the total mass of the HIPE is about 40% (40 parts external phase to 100 parts HIPE), 38%, 36%, 34%, 32%, 30%, 28%, 26%, 24%, 22%, 20%, 18%, 16%, 14%, 12%, 10%, 8%, 6%, 5%, 4%, 3% or 2% of the total HIPE mass. In the Examples section that follows below, in some embodiments the external phase consists of mostly water, some of which also reacts, and about 0.5% polysaccharide.

In some embodiments, the density of the composition-of-matter having an open-cell microstructure ranges from 0.01 to 0.4 gram/cm$^3$. In some embodiments, the density of the composition-of-matter having a quasi-closed-cell microstructure ranges from 0.2 to 0.5 gram/cm$^3$. If the density of the entrapped organic composition is low, as in some alkanes (less than 1 g/cc), then the polyHIPE density will be low. If the density of the entrapped organic phase is high, as in some fluorinated alkanes (more than about 2.0 g/cc), then the polyHIPE density will be high. In some embodiments, the density of the composition-of-matter having a closed-cell microstructure ranges from 0.2 to 1.9 gram/cm$^3$.

HIPE Composition:

When referring to the chemical composition of a polymer, such as the one comprising the presently provided composition-of-matter, one may refer to the chemical composition of the external and internal phases of the HIPE, or to the pre-polymerization mixture that preceded the polyHIPE, namely the mixture of monomers, catalysts, crosslinking agents and other ingredients which were present and contributed to the polymerization step; the contents of the pre-polymerization mixture therefore defines the chemical composition of the polymer that is formed therefrom.

According to some embodiments of the present invention, the HIPE is an oil-in-water HIPE, meaning that the external phase is an aqueous pre-polymerization mixture. In some embodiments of the composition-of-matter provided herein, the pre-polymerization mixture comprises the external medium (water), the internal medium (an organic solvent), at least one type of monomer in the external phase and at least one type of monomer in the internal phase, while other ingredients may include an emulsion stabilizer, a polymerization catalyst, an optional crosslinking agent, and other factors that affect the polymerization process, or do not.

According to some embodiments of the present invention, the HIPE is a water-in-oil HIPE, meaning that the external phase is an organic pre-polymerization mixture. In embodiments of the composition-of-matter provided herein, the pre-polymerization mixture comprises an organic external medium, an aqueous internal medium, at least one type of monomer in the external phase and at least one type of monomer in the internal phase. In some embodiments, the internal phase is water or an aqueous solution, while other optional ingredients in the phases may include an emulsion stabilizer, a polymerization catalyst, an optional crosslinking agent, and other factors that affect the polymerization process, or do not.

It is noted that for practical reasons, the optional emulsion stabilizer is added to the external phase, and the polymerization catalyst is added after the HIPE is formed, thus it is also practically and effectively added to the external phase, no matter whether it is water-soluble or organic-soluble and whether the HIPE is water-in-oil or oil-in-water.

In some embodiments, the organic solvent of the internal phase is an alkane, an alkene, an alkyne, a haloalkane, an alkyl ether, an aryl ether, a cycloalkane, an aryl, a haloaryl, a heteroaryl and any combination thereof.

As used herein, the term "alkane" describes an aliphatic hydrocarbon including straight chain and branched chain groups having 1 to 40 carbon atoms, or 1-20, 1-10 carbon atoms or 1-8 carbon atoms. Whenever a numerical range; e.g., "1-10", is stated herein, it implies that the alkane or an "alkyl" group, may contain 1 carbon atom, 2 carbon atoms, 3 carbon atoms, etc., up to and including 10 carbon atoms. The alkane can be substituted or unsubstituted. When substituted, the substituent can be, for example, a substantially linear alkyl, a substantially cyclic alkyl (cycloalkyl), an alkenyl, an alkynyl, an aryl, a heteroaryl, a hydroxy, an alkyl interrupted by an O atom (ether or alkoxy) and an alkyl terminated by an O atom (a hydroxyalkyl). The term "alkane", as used herein, may also encompasses in some embodiments, saturated or unsaturated hydrocarbon, hence this term further encompasses alkene and alkyne.

The term "alkene" describes an unsaturated alkane, as defined herein, having at least two carbon atoms and at least one carbon-carbon double bond. The alkene may be substituted or unsubstituted by one or more substituents, as described hereinabove.

The term "alkyne", as defined herein, is an unsaturated alkyl having at least two carbon atoms and at least one carbon-carbon triple bond. The alkyne may be substituted or unsubstituted by one or more substituents, as described hereinabove.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl hereinabove.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl may be substituted or unsubstituted as described for alkyl hereinabove.

In some embodiments, the internal phase is an organic hydrophobic, water-immiscible solvent or a mixture of more than one such solvent. In some embodiments, the organic solvent of the internal phase of the HIPE, which may also be the organic solvent of the entrapped organic composition (the remnants of the internal phase), is a solid at room temperature, in which case the HIPE is prepared with the molten substance. Exemplary organic solvents includes, without limitation, cyclohexane, toluene, octadecane, xylene, tichloroethylene, naphthalene, 1,4-dichlorobenzene, any hydrocarbon-based oil, and silicone-based oil, di-isopropyl ether, pentane, methyl-ethyl ketone, methyl-t-butyl ether, hexane, heptane, di-ethyl ether, ethyl acetate, dichloromethane, 1,2-dichloroethane, chloroform, carbon tetrachloride, butyl acetate, n-butanol, benzene, and any combination thereof.

Organic compounds that are solid at room temperature, yet useful in the context of some embodiments of the present invention when molten to a liquid form, include $C_{17}$ alkanes and higher alkanes, as well as paraffin and waxes and other solid organic compounds having a melting point above room temperature, collectively referred to herein as "phase change materials" or "melts". When using melts, the HIPE is formed with a heated and thus liquefied internal phase, which is then mixed with the external phase in order to form the HIPE. In some embodiments the external phase is heated as well to keep the room temperature solid from solidifying prematurely. Before the HIPE is formed and stabilized.

In some embodiments, the internal phase is an aqueous phase, the remnants of which may be an aqueous composition that is entrapped in a closed-cell microstructure. This entrapped aqueous composition is therefore the non-reactive part of the internal aqueous phase or residual reactant which has not reacted.

The internal phase may also include other ingredients which are used primarily as ingredients of the entrapped organic or aqueous composition, rather than ingredients that contribute to the stabilization of the HIPE or the formation of the polymer. These ingredients can be selected so as to exert a certain effect when the entrapped organic or aqueous composition is released from the composition-of-matter presented herein or to exert a certain effect when the organic or aqueous composition is entrapped within the composition-of-matter presented herein. For example, the internal phase, and hence the entrapped organic or aqueous composition, includes optional ingredients such as oils (oil-in-water embodiments), fragrances, bioactive agents (drug and other pharmaceuticals), insecticides, herbicides, cosmetic agents, sealants, cleaning fluids, adhesives, absorptive materials, lubricants, electrolytes, energetic (explosive) materials, dyes, fluorescent materials, chemical indicators, flammable materials, flame retardants, and any combination thereof, all of which are releasably encapsulated in the closed-cell composition-of-matter presented herein.

Emulsion Stabilizers:

As discussed hereinabove, one of the challenges in forming a polyHIPE is stabilizing the precursor HIPE though the polymerization reaction. Typically a HIPE is stabilized by a surface active agent, generally referred to herein as an emulsion stabilizer. In the context of embodiments of the present invention, suitable emulsion stabilizers include surfactants and solid particles, and in some embodiments the emulsion is stabilized by certain types of hydrophilic monomers.

According to some embodiments of the present invention, the emulsion stabilizer is a surfactant, being a synthetic (man-made) hydrophilic non-ionic molecule. Exemplary hydrophilic non-ionic surfactants include, without limitation, poloxamers, members of the alkylphenol hydroxypolyethylene family and a polyethoxylated sorbitan esters (polysorbitans). Other types of surfactants, such as anionic and cationic surfactants are also contemplated within the scope of the present invention.

In some embodiments, the surfactant is suitable for stabilizing water-in-oil HIPEs, such as the Span family of surfactants (such as sorbitan monooleate (SMO), sorbitan monolaurate (SML)), olyglycerol polyricinoleate (PGPR), and the Hypermer family of surfactants.

In some embodiments, the surfactant is suitable for stabilizing oil-in-water HIPEs, such as the Tween family of surfactants, the Triton family of surfactants, sodium lauryl sulfate (SLS), sodium dodecyl sulfate (SDS), and, in addition block copolymers such as PEO—PPO—PEO and the likes.

In some embodiments, the surfactant is a member of the commercially available Pluronic® type surfactant, all of which are block copolymers based on poly(ethylene oxide) and poly(propylene oxide). Pluronics can function as anti-foaming agents, wetting agents, dispersants, thickeners, and emulsifiers.

In some embodiments, surfactant is a member of the commercially available Synperonic™ PE type surfactant, constituting a family of non-ionic, tri-block copolymer surfactants suitable for industrial and pharmaceutical applications. These poloxamers are chemically very similar, differing only in their poly(propylene oxide) to poly(ethylene oxide) content. This variation causes the physical and surface active properties of the poloxamers to vary. Individual Synperonic™ PE surfactants are suitable for a variety of applications, including parenteral and ophthalmic delivery systems, cell culture applications, dental care and medicated skin care formulations such as antibacterial washes and anti-acne formulations.

In some embodiments, the surfactant is a member of the commercially available Kolliphor™ type surfactant, which include Kolliphor® CS 12, Kolliphor® CS 20, Kolliphor® CS A, Kolliphor® CSL, Kolliphor® CSS, Kolliphor® EL, Kolliphor® ELP, Kolliphor® HS 15, Kolliphor® P 188, Kolliphor® P 188 micro, Kolliphor® P 237, Kolliphor® P 338, Kolliphor® P 407, Kolliphor® P 407 micro, Kolliphor® PS 60, Kolliphor® PS 80, Kolliphor® RH 40, Kolliphor® SLS Fine and Kolliphor® TPGS.

In some embodiments, the surfactant is Poloxamer 407, Pluronic F-127, Pluronic P-123, Triton X-405, Triton X-100, Triton X-705 and Tween 20.

In some embodiments, emulsion stabilization is afforded in the context of a Pickering emulsion, which is an emulsion that is stabilized by solid particles, such as surface-modified colloidal silica (silica nanoparticles) that adsorb onto the interface between the two phases. In the context of embodiments of the present invention, the solid particles can be modified so as to present certain functionalities on their surface, which can take part in the polymerization reaction. For example, silanes bearing particles can react with isocyanates, silanes bearing isocyanates, and the silanol groups on the silica surface can be used to crosslink poly(urethane urea).

According to some embodiments of the present invention, the solid particles are inorganic or organic (polymeric) nanoparticles which are suspendable in liquid media and can stabilize a HIPE, namely capable of forming Pickering HIPE compositions. As noted hereinabove, HIPEs can be stabilized with nanometer-sized particles to micrometer-sized particles, hence the description of surface modification of the particles applies to particles of all sizes. Additional information regarding emulsion stabilizing solid particles can be found in the art [Silverstein, M. S., *Polymer*, 2014, 55, pp. 304-320; and Silverstein, M. S. and Cameron, N. R., *PolyHIPEs—Porous Polymers from High Internal Phase Emulsions*, Encyclopedia of Polymer Science and Technology, 2010].

In some embodiments, the HIPE is stabilized by one of the hydrophilic monomers, as many such monomers have a plurality of functional groups and moieties that impart an amphiphilic characteristics to the molecule, or tend to absorb at the oil-water interface and provide steric hindrance that prevents droplet coalescence, which is essential for HIPE stabilization. For example, many polysaccharides, polyols and polypeptides, as well as other naturally occurring molecules, serve as emulsifiers in the food, cosmetics and pharmaceutical industry. Such large or macro-molecular substances can also help form the polymer of the present invention, when dissolved or suspended in the continuous aqueous phase of the HIPE.

In some embodiments, at least one of the hydrophilic monomers serves as the emulsion stabilizer in the HIPE, which is stable enough to undergo polymerization without the presence of any other type of emulsion stabilizer, namely without the presence of a surfactant, as this is defined herein, or a plurality of solid particles. In such embodiments, the composition-of-matter presented herein is devoid of a surfactant and/or emulsion stabilizing solid particles, namely the polymer comprising the composition-of-matter is devoid of a surfactant and/or emulsion stabilizing solid particles. In other words, the polymer is devoid of an emulsion stabilizer that is not a monomer thereof or a residue of a monomer therein.

Process of Preparation:

In general, the composition-of-matter presented herein is prepared by first forming a stable HIPE from an organic solution (the organic phase) that includes at least one hydrophobic monomer and an aqueous solution (the aqueous phase) that includes at least one hydrophilic monomer and/or water. The HIPE is prepared by dropwise addition of the internal organic phase into a container where the aqueous phase is being stirred continuously. Alternatively, the HIPE can be formed by placing the two liquid solution in a mixer/blender/homogenizer device, and applying power to the device, thereby obtaining a HIPE. Other methods of obtaining a HIPE are also contemplated within the scope of the present invention.

Once a stable HIPE is obtained, a polymerization catalyst is added to the HIPE while stirring, and then the stirring is ceased and the HIPE is allowed to polymerize (cure), to thereby afford a polyHIPE. In some embodiments, the polymerization process takes place without the use of a catalyst, and in some embodiments the polymerization process is invigorated by heat.

The cured polyHIPE is then optionally washed thoroughly, typically by Soxhlet extraction, and/or optionally dried under vacuum and/or heating. In some embodiments the polyHIPE is freeze-dried, or ambient-dried at room temperature.

In the context of embodiments of the present invention, the polymerization catalyst is a chemical compound that drives the polymerization reaction without being consumed in the process, thus without becoming an integral part of the polymer. According to some embodiments, the polymerization catalyst is tetramethylethylenediamine (TEMED), dibutyltin dilaurate (DBTDL) stannous octoate, dibutyltin diacetate, dibutyltin mercaptide, dioctyltin bis(2-ethylhexylthioglycolate), dioctyltin carboxylate, dimethylcyclohexylamine, pentamethyldiethylenetriamine, 1,4-dimethyl-piperazine, N,N-dimethylethanolamine (DMEA), diaminobicyclooctane (DABCO), bis(2-dimethylaminoethyl)ether (BDMAEE), N-ethylmorpholine, N'N'-dimethylpiperazine, N,N,N',N',N''-pentamethyl-diethylene-triamine (PMDETA), N,N-dimethylcyclohexylamine (DMCHA), N,N-dimethylbenzylamine (DMBA), N,N-dimethylcethylamine, N,N,N',N'',N''-pentamethyl-diproylene-triamine (PMDPTA), yritehylamine and 1-(2-hydroxypropyl) imidazole.

In some embodiments, the aqueous solution further includes an emulsion stabilizer, as this ingredient is discussed hereinabove.

In some embodiments, the organic phase includes optional ingredients that do not necessarily form a part of the polymer, but form a part of the entrapped organic or aqueous composition in embodiments where the composition-of-matter has a closed-cell microstructure. In some embodiments, the optional ingredients in the internal phase, organic or aqueous, are meant to be entrapped for a long term or entrapped and released with the releasably entrapped organic or aqueous composition upon applying stress, strain or deformation to the composition-of-matter, or another cell-opening condition to the closed-cell composition-of-matter.

Applications and Uses:

The composition-of-matter presented herein can be divided into three main families, the open-cell family which is essentially a family of foams, the quasi-closed cell or capsule-like family which is not highly interconnected but does not entrap the internal phase, and the closed-cell family, sometimes referred to herein as truly closed-cell, which is designed to entrap and in some embodiments release the entrapped organic or aqueous composition under certain conditions, such as deformation of the composition-of-matter.

As foams, the composition-of-matter is suitable for applications which require the use of a polymer having alternating residues of hydrophilic monomers and hydrophobic monomers. These polymers offer a wide range of mechanical properties, mainly stemming from the selection of monomers. Open-cell composition-of-matter, according to some embodiments of the present invention, can be used as tissue engineering scaffolds, absorbents, insulation, energy absorbing materials and the likes.

Members of the closed-cell family are individually designed based on the optional ingredient that is added to the internal phase during the preparation of the composition-of-matter, which later becomes the entrapped organic or aqueous composition. For example, in the exemplary case of an oil-in-water HIPE, an oil or another lubricant is present in the organic phase to afford an available source of lubrication that becomes available when the composition-of-matter is deformed and released the organic composition entrapped therein. In another embodiment, an insecticide or an herbicide is present in the internal phase of the precursor HIPE that affords a composition-of-matter that can be incorporated into an agricultural device for delivering insecticides or herbicides.

Hence, according to an aspect of some embodiments of the present invention, the composition-of-matter forms a part or is an article of manufacturing, either in the open-cell form as a dry, partially loaded (soaked) or fully loaded, or in the closed-cell form having a non-releasably entrapped or a releasably entrapped organic or aqueous composition therein.

Due to their unique mechanical properties, the composition-of-matter can be cast in the liquid HIPE form into any shape and size mold before polymerization, or they can be reshaped and further processed following casting and polymerization in the dry open-cell foam or the loaded closed-cell form. The composition-of-matter can, therefore, take any size of a block, a sphere, a rod, a particle (powder), a flat or shaped sheet, a tube or a fiber.

The article of manufacturing in which a loaded closed-cell composition-of-matter is incorporated can be any one of the non-limiting examples that include fire-retardant devices, chemical detector devices, fragrance carrier and releasing devices, adhesive carrier and releasing devices, cosmetic carrier and releasing devices, energy storage devices, absorptive devices, detonating and explosive devices, insecticide carrier and releasing devices, herbicide carrier and releasing devices, drug delivery devices, coloration and marking devices, cleaning devices, sealing devices, ignition devices, incendiary devices, coating devices, insulating devices, anti-corrosion devices, nutrition and fertilization devices, toxin carrier and releasing devices and a lubrication carrier and releasing devices.

In some embodiments of the present invention, the composition-of-matter is edible or otherwise safe for consumption by humans and animals. For example, in an edible article, the polymer of the composition-of-matter can be made from edible monomers, such as polysaccharides, and the entrapped composition may include drugs, nutrients and/or flavoring ingredients that are released upon chewing the composition-of-matter.

In some embodiments, the composition-of-matter is biodegradable or otherwise decomposes into substances that are environmentally friendly and safe for humans, animals and plants, except for some optional ingredients in the entrapped composition which target a particular microorganism, plant, insect or animal. For example, in an environmentally safe article for agricultural use, the polymer of the composition-of-matter is biodegradable upon wetting, and the entrapped composition may include an herbicide that will become available and active only when the soil within which it is dispersed becomes wet, such as at the beginning of the rainy season when weeds start to germinate and sprout In some embodiments, the composition-of-matter is made of an elastic polymer, and thus it can be used to form stretchable isolating films, sheets, blocks or otherwise any object, that when punctured or penetrated, ooze a solution containing an active agent such as, without limitation, a drug, an antibiotic agent, a polypeptide, an antibody, a catalyst, an anticorrosion agent, a fire retardant, a sealing agent, an adhesive agent, a colorant, an odoriferous agent, a lubricant, and any combinations thereof. The nature and optimal use of an article-of-manufacturing made from an elastic composition-of-matter depends on the nature of the polymer and the liquid entrapped therein. Due to the ratio of entrapped liquid to polymer, the entrapped liquid being the major component of the composition-of-matter, would have a more profound influence on the practical uses thereof. For example, a liquid with high energy absorption properties, such as, for example aqueous solutions of hydroxypropyl methylcellulose and other viscoelastic liquids, will render the composition-of-matter more suitable for use in the manufacturing of an article for impact absorption. In another general example, a composition-of-matter exhibiting an entrapped solution of an active agent will be suitable for use in the manufacturing of an article wherein leakage of the solution concurrent to impact effects delivery of the solution at the location of the puncture caused by the impact.

The article-of-manufacturing can benefit from the flexibility of an elastomeric polymer and energy-absorbing and dissipating capacity of the entrapped liquid, and be used as, for non-limiting example, an energy absorption and dissipation article (insoles, bike seats cushions, carpet underlay, etc.), a vibration absorption article (motor mounts, loudspeaker mounts, etc.), a noise absorption article (quiet-room insulation, earplugs, etc.), a cushioning article, a thermal insulating article (cold/hot packs, refrigerator and air-conditioning insulation, etc.), and an impact protection article (protective sportswear, battle gear, etc.).

In cases where the liquid is an aqueous solution, composition-of-matter can be used as dampening material, moisture and humidity control material, fire resistant material, etc.

When having a biologically active agent as a solute in the entrapped liquid, the composition-of-matter can be used to form surgical gloves, septum seals, and other medical devices wherein a drug or a disinfectant is required upon penetration of a barrier. An exemplary use of an LDE is the manufacturing of an elastomeric glove with a sealant and colored liquid entrapped in the elastomeric matrix. Such a glove, when accidentally punctured, will provide self-sealing and breach warning functionality to the user.

In some embodiments, the article of manufacturing is selected from the group consisting of an energy absorption and dissipation article, a vibration absorption article, a noise absorption article, a cushioning article, a thermal insulating article, an impact protection article, dampening material, moisture and humidity control material, fire resistant material and any combination thereof Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Materials and Methods

In some embodiments, the composition-of-matter presented herein is based on a polymer containing the residues of a polysaccharide and a polyphenol (hydrophilic monomers), alternating with a residue of a diisocyanate (hydrophobic monomer), templating an oil-in-water HIPE, wherein the internal organic phase is a solution of the diisocyanate dissolved in an organic solvent, and the external aqueous phase is a solution of the polysaccharide and the polyphenol in water.

Materials:

Hydrophilic polysaccharide monomers: alginate (ALG), pectin (PEC), dextran (DEX) and chitosan (CHI) (Sigma-Aldrich); Hydrophilic polyphenol monomers: tannic acid (TA) (Sigma-Aldrich); hydrophobic diisocyanate monomer: hexamethylene diisocyanate (HDI) (Sigma-Aldrich or Alfa Aesar); organic solvent: cyclohexane; surfactant: Triton X-405 (Sigma-Aldrich) or Pluronic™ F127 (a commercial triblock copolymer based poly(ethylene glycol) (PEG) and poly(propylene glycol) (PPO); Poloxamer 407 hydrophilic non-ionic surfactant; a PEG-b-PPO-b-PEG with 70% PEG having Mw=12,600 g/mol and 70% PEG) (Sigma-Aldrich); polymerization catalyst: N,N,N',N'-tetramethylethylenediamine (TEMED) (Sigma-Aldrich or Alfa Aesar) or dibutyltin dilaurate (DBTDL) (Sigma-Aldrich). Other materials were used as-is from various sources.

Methods:

A critical principle in the preparation of the composition-of-matter presented herein, is to generate an oil-in-water HIPE with sufficient kinetic stability that remains stable during polymerization of the HIPE. While a typical oil-in-water HIPE requires relatively high concentrations of surfactant serving as a stabilizing emulsifier (between 20-30 percent by weight of the continuous phase), and oftentimes requires a combination of surfactants, the presently provided oil-in-water HIPE of polysaccharides, polyphenols and diisocyanates surprisingly required relatively small amount of, or no additional surfactant for sufficient stability, essentially since the hydrophilic monomers also act as HIPE-stabilizing agents (emulsifiers).

Briefly, the two phases of the HIPE were prepared as solutions of HDI in cyclohexane and polysaccharide/polyphenol in water. The aqueous solution was placed in a 100 mL beaker cooled in an ice bath and stirred with an overhead stirrer at 400-600 rpm. Thereafter, a corresponding amount of the organic solution was added drop-wise under constant stirring.

The polymerization catalyst was added immediately after the formation of the HIPE followed by additional 3 minutes of stirring. Polymerization took place for 24 hours at 37-65° C. The resulting polyHIPEs were dried under vacuum until a constant weight was obtained.

Some of the sample names x-y reflect the monomer composition where x indicates the polysaccharide (CHI, ALG, PEC, or DSX) and y indicates the relative HDI content (H, M, L for high, medium, low, respectively).

Density:

The density of the composition-of-matter was predicted by calculation based on the HIPE recipe or determined gravimetrically. The open-cell and quasi-closed cell samples were thoroughly dried in vacuum for 3 days to exclude the water from the external phase and the solvent from the internal phase prior to the measurement (average of 3-6 measurements). The truly closed-cell samples were placed in a vacuum for 1 week prior to the measurement (average of 3-6 measurements).

Scanning Electron Microscopy (SEM):

The morphology, porosity and microstructure studies of cryogenic fracture surfaces of the samples of the composition-of-matter, according to some embodiments of the present invention, were performed by scanning electron microscopy. HRSEM micrographs were taken on a FEI Quanta 200. The sample was mounted on a carbon tab and sputter-coated with a thin layer of gold-palladium prior to SEM analysis. The samples of truly closed-cell microstructure were placed in a vacuum for 1 hr before coating.

Mechanical Properties:

Compression is often used to describe and define foams and hydrogels. Compressive stress-strain tests were performed on the resulting polyHIPE structures, as provided herein, at room temperature (using an Instron 3345). The samples were compressed until a strain of 70% was reached (a safety limitation; none of the samples exhibited large-scale failure up to 70% compressive strain).

The compressive modulus, E, is a substance's resistance to uniform compression at low strains as determined from the slope of the linear portion of the stress-strain curve at low strains. E reflects the initial stiffness or resistance to deformation of a substance. A high E value means that the tested material changes its shape minimally when under stress at relatively low strains, namely one needs to apply a higher stress in a high compressive modulus material, and a lower stress in a low compressive modulus material, in order to confer the same amount of deformation. Thus, high E values are desired in foams used for most "structural" applications.

CF is the strain at which a sample of a material fails (strain at fail). It represents how much compressive strain can be applied to the material without causing a mechanically failure. For "stretching", a material with a high CF can be pulled considerably without failing (rubber), while a material with a low CF can only be "stretched" by a minimal amount (glass). The compressive strain at fail of a sample is given in percent values, which mean that the sample can be compressed by an amount in percent of its original height before it fails. A higher strain at fail value means a more deformable (less brittle) material.

$\sigma_F$ reflects the strength of a material, i.e., the stress at which the material undergoes catastrophic failure. $\sigma_{70}$ is the stress at 70% strain (unidirectional compressive deformation). It is used to compare samples that do not fail at 70% compressive strain, and is largely used to emphasize the fact that the materials have reached 70% strain without failing. Typically, when reaching 70% deformation, a material has collapsed, often after a "stress plateau" where the stress remains constant for a large strain range. The 70% value for the end of the test is chosen arbitrarily for safety but is commonly used in the art. If a composition-of-matter, according to some embodiments of the present invention, is described using a $\sigma_{70}$ value, it typically means that it did not undergo a large-scale failure.

Example 1

Various Polysaccharides

Table 1 presents recipes of some examples of the composition-of-matter presented herein, and presenting the predicted (calculated) and measured density thereof, comparing various polysaccharides used as hydrophilic monomers, wherein the amounts are given as weight percent based on the total weight of the HIPE.

TABLE 1

| | Sample code: | | | |
|---|---|---|---|---|
| | PEC | CHI | ALG | DEX |
| External, Aqueous Phase | | | | |
| $H_2O$ | 23.30 | 23.30* | 23.30 | 22.91 |
| Polysaccharide | 0.52 | 0.52 | 0.52 | 1.28 |
| Triton X-405 | 1.20 | 1.20 | 1.20 | — |
| Pluronic F127 | — | — | — | 0.76 |
| Total | 25.02 | 25.02 | 25.02 | 24.95 |
| Internal, Organic Phase | | | | |
| Cyclohexane | 59.74 | 59.74 | 59.74 | 59.75 |
| HDI | 14.99 | 14.99 | 14.99 | 15.05 |
| Total | 74.73 | 74.73 | 74.73 | 74.80 |
| Catalyst (added after HIPE formation) | | | | |
| Type | DBTDL | DBTDL | DBTDL | DBTDL |
| | 0.25 | 0.25 | 0.25 | 0.25 |
| Density and Mechanical Properties | | | | |
| $\rho_{predicted}$, g/cc | 0.141 | 0.141 | 0.141 | 0.145 |
| $\rho_{measured}$, g/cc | 0.153 | 0.057 | 0.124 | 0.132 |
| E, MPa | $0.44_{\pm 0.29}$ | $1.06_{\pm 0.34}$ | $0.78_{\pm 0.70}$ | $0.67_{\pm 0.47}$ |
| $\sigma_{70}$, MPa | $1.98_{\pm 1.53}$ | $0.18_{\pm 0.02}$ | $0.36_{\pm 0.23}$ | $1.44_{\pm 0.32}$ |

*1% aqueous solution of acetic acid

The samples were dried to afford a porous composition-of-matter having a weight corresponding to the polymer without the internal phase mass, namely having an open-cell microstructure, however, compressive stress-strain measurements have shown some quasi-closed-cell characteristics.

FIG. 1 presents a comparative compressive stress-strain curve obtained from the samples presented in Table 1 above.

As can be seen in FIG. 1, the samples prepared from chitosan and alginate (CHI and ALG) exhibited the mechanical behaviour of open-cell polyHIPEs, e.g., a stress plateau, while the samples prepared with pectin and dextran (PEC and DEX) exhibited higher stresses at 70% strain, indicative of quasi-closed-cell polyHIPEs.

The results indicate that the properties of the composition-of-matter depend on the nature of the polysaccharide used as the hydrophilic monomer. The mechanical behaviour was influenced by the porous morphology, whereas open-cell structures exhibited the mechanical behaviour of typical polyHIPEs (e.g. a stress plateau), and the quasi-closed-cell structures exhibited higher $\sigma_{70}$ than the open-cell structures, reflecting the higher resistance to deformation of the air-filled capsule-like structures.

Example 2

Diisocyanate Effect

It had been predicted that the higher the hydrophobic monomer content, the more likely that a quasi-closed-cell or even a truly closed-cell structure will be formed, since the polymeric film growing at the interface of the phases will grow faster and thicker. The resulting composition-of-matter exhibited open- and quasi-closed-cell since the internal phase solvent could be removed under vacuum.

Table 2 presents recipes of some examples of the composition-of-matter presented herein, and presents the predicted (calculated) and measured density thereof, comparing various amounts, low (L), medium (M) and high (H), of the hydrophobic monomer, HDI, wherein the amounts are given as weight percent based on the total weight of the HIPE.

TABLE 2

| | Sample code: | | |
|---|---|---|---|
| | L | M | H |
| External, Aqueous Phase | | | |
| $H_2O$ | 23.13 | 23.30 | 23.15 |
| Polysaccharide | 0.52 | 0.52 | 0.50 |
| Surfactant | 1.26 | 1.20 | 1.27 |
| Total | 24.91 | 25.02 | 24.92 |
| Internal, Organic Phase | | | |
| Cyclohexane | 72.22 | 59.74 | 12.51 |
| HDI | 2.62 | 14.99 | 62.32 |
| Total | 74.84 | 74.73 | 74.83 |
| Catalyst (added after HIPE formation) | | | |
| DBTDL | 0.25 | 0.25 | 0.25 |
| Density and Mechanical Properties | | | |
| $\rho_{predicted}$, g/cc | 0.039 | 0.141 | 0.620 |
| PEC $\rho_{measured}$, g/cc | 0.033 | 0.153 | 0.353 |
| ALG $\rho_{measured}$, g/cc | 0.041 | 0.124 | |
| CHI $\rho_{measured}$, g/cc | 0.028 | 0.057 | 0.574 |
| DEX $\rho_{measured}$, g/cc | 0.066 | 0.132 | |
| PEC E, MPa | 0.05 ± 0.05 | 0.44 ± 0.29 | |
| PEC $\sigma_{70}$, MPa | 0.11 ± 0.06 | 1.98 ± 1.53 | |
| CHI E, MPa | 0.07 ± 0.03 | 1.06 ± 0.34 | |
| CHI $\sigma_{70}$, MPa | 0.03 ± 0.01 | 0.18 ± 0.02 | |
| ALG E, MPa | 0.10 ± 0.03 | 0.78 ± 0.70 | |
| ALG $\sigma_{70}$, MPa | 0.08 ± 0.02 | 0.36 ± 0.23 | |

As can be seen in Table 2, the density increases with the HDI content, as expected. The densities of the high HDI content polyHIPEs (H) are lower than expected, indicating low yields due to the encapsulation of the HDI, or blocking of the interfacial polymerization by the formation of a polymer film.

Figure 2:
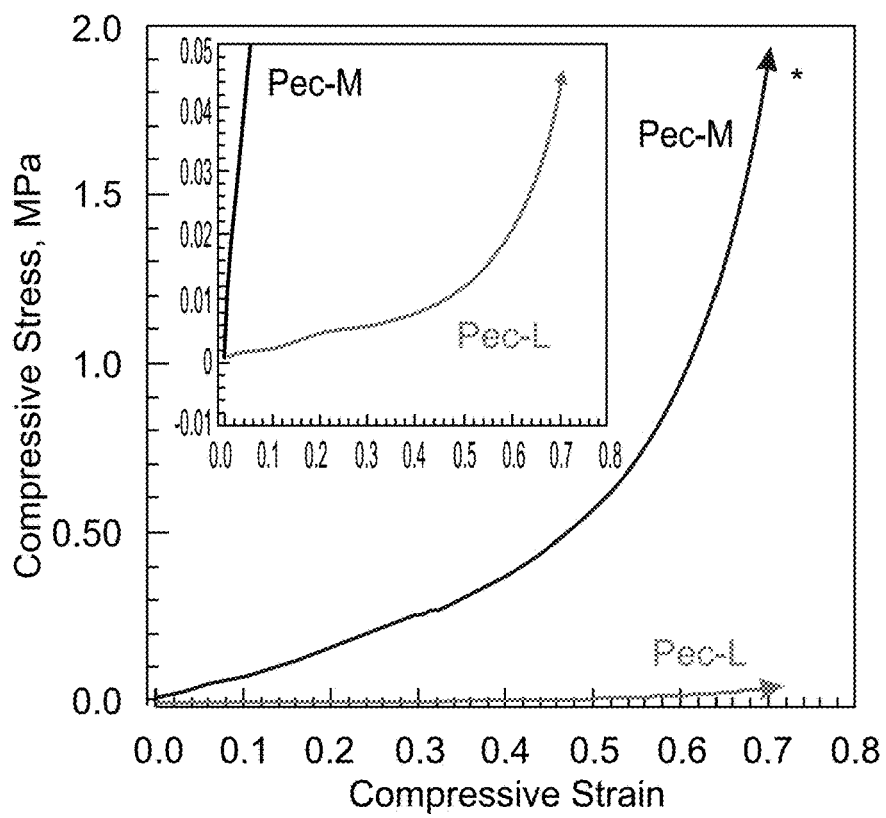
FIG. 2 presents a comparative compressive stress-strain curve obtained for dried samples of exemplary composition-of-matter comprising pectin as a hydrophilic monomer and two levels of a hydrophobic diisocyanate monomer (e.g., hexamethylene diisocyanate, HDI), low (L) and medium (M), as presented in Table 2, whereas the inset shows the curves at the 0-0.05 MPa compressive stress range.

FIG. 2 presents a comparative compressive stress-strain curve obtained for dried samples of exemplary composition-of-matter comprising pectin as a hydrophilic monomer and two levels of HDI, low and medium, as presented in Table 2, whereas the inset shows the curves at the 0-0.05 MPa compressive stress range.

As can be seen in FIG. 2, the compressive stress-strain analysis of the dried composition-of-matter, comprising pectin as a hydrophilic monomer shows that the medium HDI content (M) sample had no "stress plateau", indicating a quasi-closed-cell microstructure, compared to the open-cell behavior of the low HDI (L) sample.

The tendency toward the formation of quasi-closed-cell structures increased with increasing HDI content, with dextran greater than pectin, then alginate and ending with chitosan, and the mechanical behavior was influenced by the morphology, by the HDI contents, and by the density. PolyHIPEs with high HDI content have lower densities than expected due to the low polymerization yields that result from "choking" the interfacial polymerization.

Example 3

Emulsion Stabilizer Effect

The stability of a HIPE is usually attributed to the presence of relatively large amounts of a surfactant, typically around 20% by weight of the external phase. In the experiment below a polysaccharide has been used as a HIPE stabilizer or co-stabilizer, and it has been predicted that a more effective HIPE stabilization will generate a more open-cell-like structure. The samples were dried to afford a porous composition-of-matter having a weight corresponding to the polymer without the internal phase mass, namely having an open-cell microstructure, however, compressive stress-strain measurements have shown some quasi-closed-cell characteristics.

Table 3 below presents some exemplary HIPE recipes, according to some embodiments of the present invention, comparing the effect of a stabilizer, wherein the amounts are given as weight percent based on the total weight of the HIPE.

TABLE 3

| | Sample code: | | |
|---|---|---|---|
| | L-S | M-S | H-S |
| External, Aqueous Phase | | | |
| $H_2O$ | 24.33 | 24.02 | 23.36 |
| Polysaccharide | 0.52 | 0.52 | 0.51 |
| Triton X-405 | 0.14 | 0.27 | 1.04 |
| Total | 24.99 | 24.81 | 24.91 |
| Internal, Organic Phase | | | |
| Cyclohexane | 72.22 | 72.45 | 72.03 |
| HDI | 2.54 | 2.50 | 2.82 |
| Total | 74.76 | 74.94 | 74.85 |
| Catalyst (added after HIPE formation) | | | |
| DBTDL | 0.25 | 0.25 | 0.25 |
| Density and Mechanical Properties | | | |
| $\rho_{predicted}$, g/cc | 0.025 | 0.026 | 0.036 |
| PEC $\rho_{measured}$, g/cc | | 0.033 | 0.181 |
| ALG $\rho_{measured}$, g/cc | | 0.079 | 0.041 |
| CHI $\rho_{measured}$, g/cc | 0.032 | 0.030 | 0.028 |

As can be seen in Table 3, decreasing stabilizer content increased the tendency to form quasi-closed-cell structures. The greater the ability of the polysaccharides to act as a HIPE stabilizer, the more likely it is that typical polyHIPE structures will be produced. Chitosan enhanced HIPE stability more than alginate, and more than pectin, as seen through its ability to produce an open-cell structure.

In one group of embodiments, producing true closed-cell structures based on ALG-TA hydrophilic monomers, the HIPE was stabilized without the use of an additional surfactant. When used as a sole source for a hydrophilic monomer, TA was not sufficient to stabilize the HIPE, and needed the addition of silica nanoparticles to produce a quasi-closed-cell polyHIPE. When used as a sole source for a hydrophilic monomer, polysaccharides were not sufficient to stabilize the HIPE, for which the addition of surfactants was needed. It is noted that a quasi-closed-cell polyHIPE was produced using tannic acid as the hydrophilic monomer in a HIPE stabilized by silica nanoparticle (results not shown). The fact that interfacial polymerization has occurred in a system containing droplets that are surrounded by shells consisting of assemblies of nanoparticle was a surprising finding.

Example 4

Open- and Quasi-Closed Cell PolyHIPE

As discussed hereinabove, step-growth interfacial polymerization is expected to produce a plurality of capsule-like polymeric shells encapsulating the internal and separating it from the external phase. This is also seen in the preparation of artificial fish roe. Thus, the ability to form monolithic polymers in the form of polyHIPEs having open-cell, quasi-closed-cell, and closed-cell microstructures, according to some embodiments of the present invention, was a surprising finding.

Figure 3A:
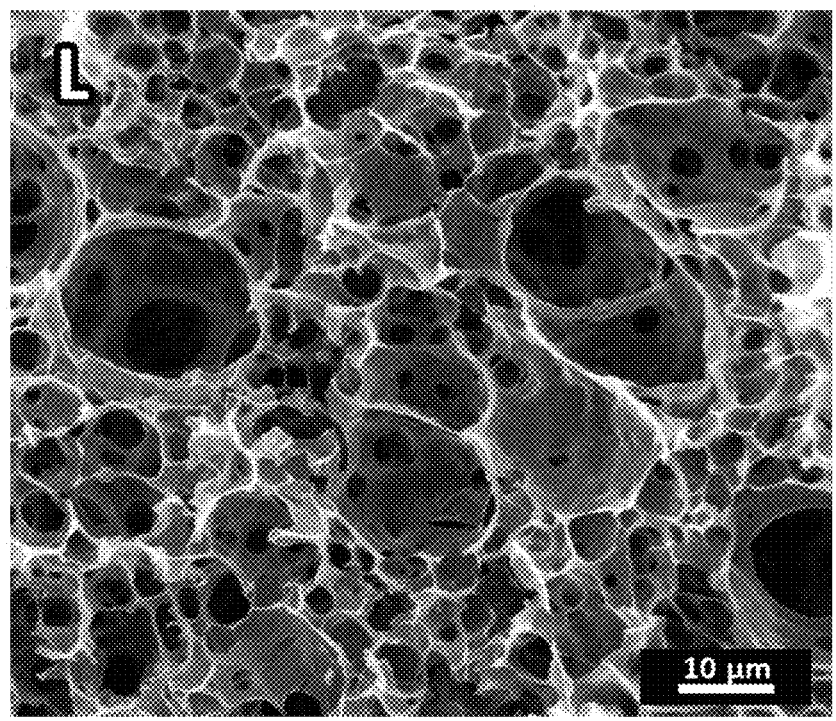
Figure 3B:
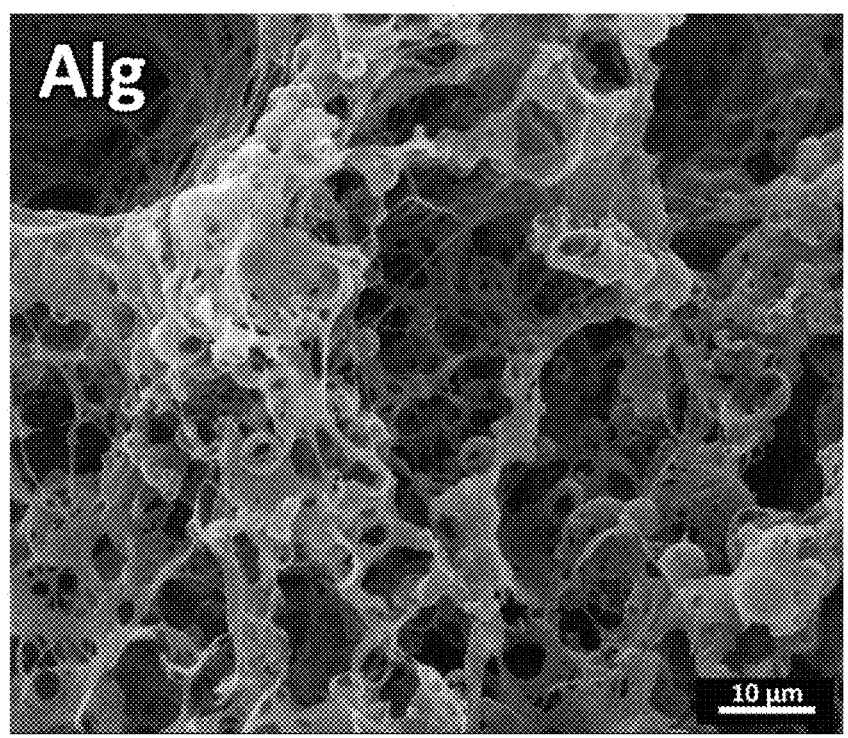
Figure 3C:
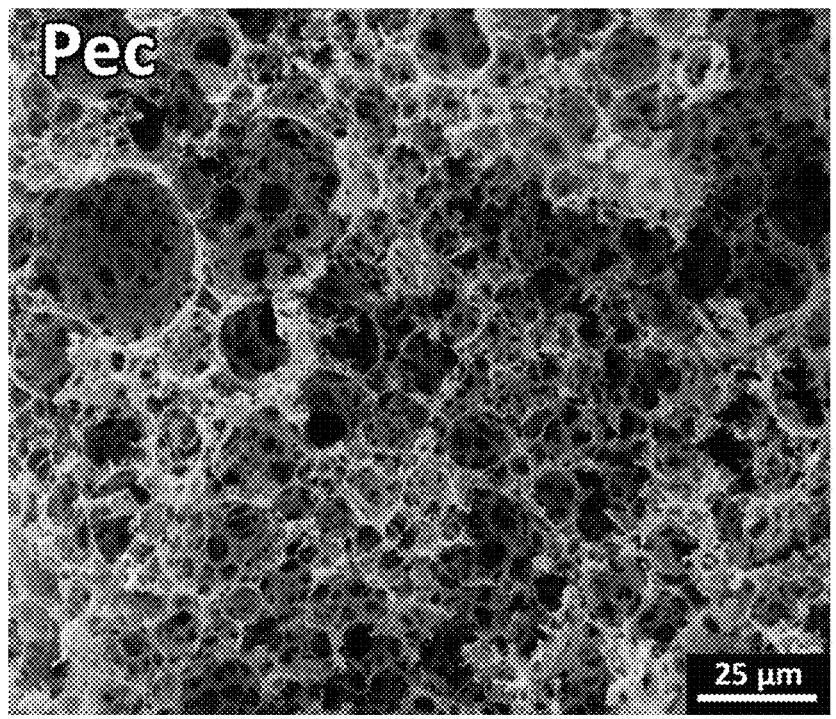
Figure 3D:
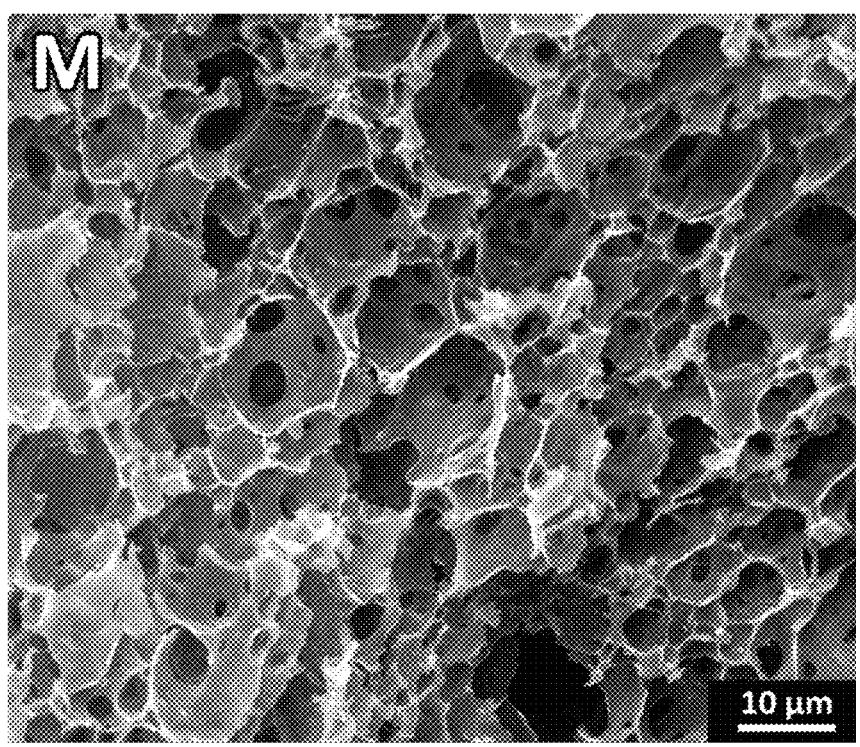

FIGS. 3A-D are electron-micrographs of the samples of exemplary compositions-of-matter having open-cell microstructures, according to some embodiments of the present invention, which were dried for 72 hours in a vacuum, wherein FIG. 3A is of sample CHI-L, 3B is of sample ALG-L, 3C is of sample PEC-L, and 3D is of sample CHI-M, the recipes of which are presented in Table 2.

The open-cell microstructures observed in FIGS. 3A-D are not the results that would have been expected from interfacial step-growth polymerizations in HIPEs. As can be seen in the results presented in Table 2 and from other studies not presented, the ability to generate such open-cell structures depends on the polysaccharide (chitosan is better than alginate, better than pectin, better than dextran), the amount of diisocyanate (a low amount is better than a medium amount, better than a high amount), the amount of emulsifier (a high amount is better than a low amount), and the catalyst (dependence on catalyst and on surfactant content not shown).

Figure 4A:
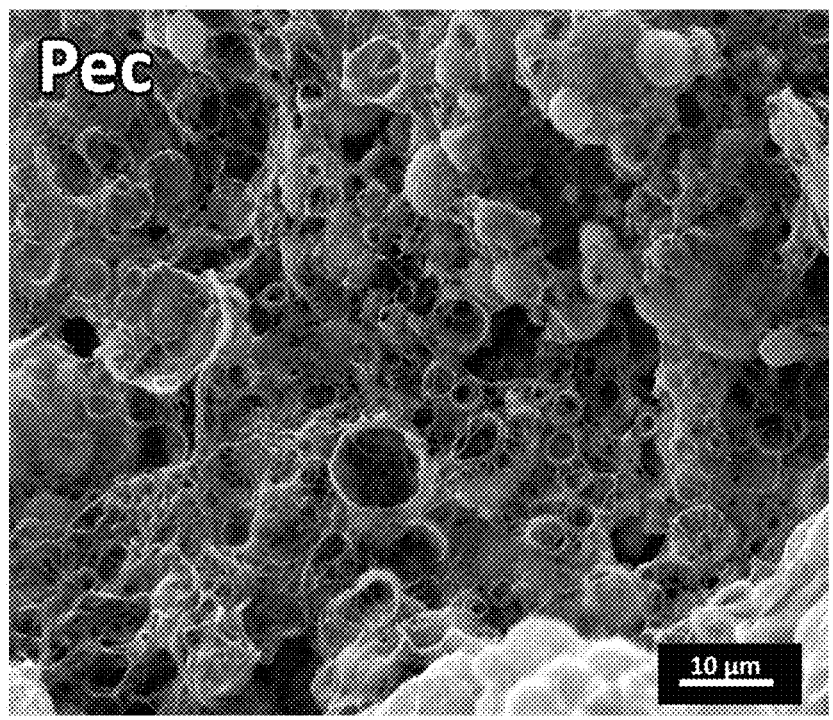
Figure 4B:
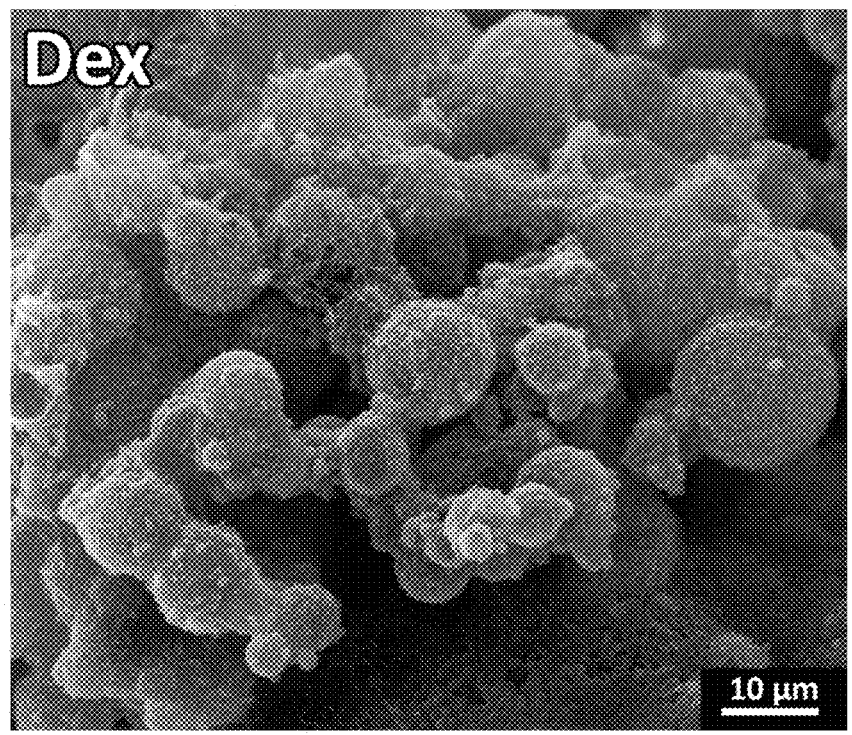
Figure 4C:
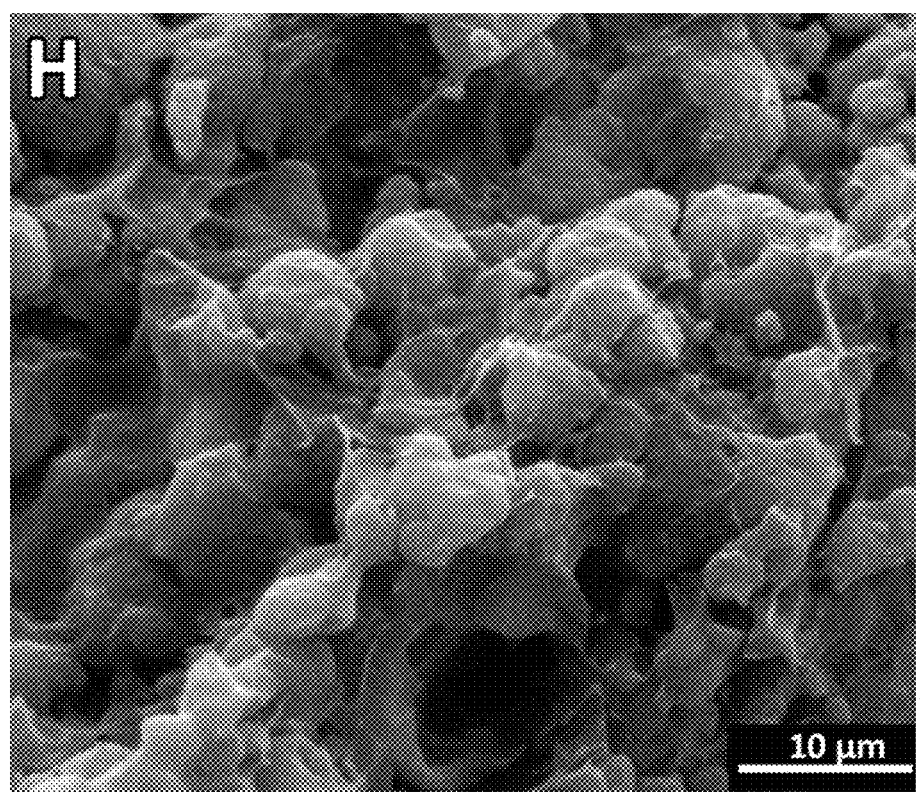

FIGS. 4A-C are electron-micrographs of the samples of exemplary compositions-of-matter having quasi-closed-cell microstructures, according to some embodiments of the present invention, which were dried for 72 hours in a vacuum, wherein FIG. 4A is of sample PEC-M, FIG. 4B is of sample DEX-M, and FIG. 4C is of sample CHI-H, the recipes of which are presented in Table 2.

As can be seen in the results presented in Table 2 and from other studies not presented, the ability to generate quasi-closed-cell structures depends on the polysaccharide (dextran is better than pectin, better than alginate, better than chitosan), the amount of diisocyanate (a high amount is better than a medium amount, better than a low amount), the amount of emulsifier (a low amount is better than a high amount), and the catalyst (dependence on catalyst and on surfactant content not shown).

Example 5

Closed-Cell Encapsulation of Organic Media

A truly closed-cell composition-of-matter, synthesized through step-growth polymerization at the oil-water interface of a surfactant-free (or "non-monomer-surfactant free" or "non-reactive-surfactant free") polyHIPE, has been demonstrated using naturally occurring alginate and tannic acid as hydrophilic monomers and emulsion stabilizers.

In this exemplary embodiment of the present invention, the non-reactive part of the dispersed organic phase of the HIPE, was entrapped in the composition-of-matter as a liquid droplet encapsulated in a closed-cell microstructure. The hydrophobic monomers were in the dispersed phase of the precursor HIPE, but these were not "entrapped" since substantially all the hydrophobic monomers reacted to become residues of the polymer. The organic medium could not be removed easily once the polymerization had taken place, even after an extended period of time under vacuum. This non-reactive part of the dispersed organic phase of the HIPE, which can be entrapped in composition-of-matter provided herein, is referred to herein as the "organic composition".

Table 4 presents recipes of some examples of the composition-of-matter described herein, and presents the calculated and measured densities thereof, comparing various ratios of the ingredients, wherein the amounts are given as weight percent based on the total weight of the HIPE, $\rho_m$ denotes the mass and volume measured density, $\rho_o$ denotes the predicted density for an open-cell composition-of-matter (with all the non-reactive part of the internal phase medium removed), and $\rho_c$ denotes the predicted density for a closed-cell composition-of-matter (with all the non-reactive part of the internal phase medium encapsulated).

TABLE 4

| Sample code: | 65 | 72 | 73 | 74 | 75 | 76 |
|---|---|---|---|---|---|---|
| External, Aqueous Phase | | | | | | |
| H₂O | 23.65 | 23.87 | 30.25 | 27.98 | 24.41 | 23.65 |
| Alginate | 0.55 | 0.56 | 0.81 | 0.62 | 0.59 | 0.56 |
| Tannic Acid | 2.72 | 2.71 | 7.69 | 1.54 | 4.59 | 2.70 |
| Total | 26.92 | 27.14 | 38.75 | 30.15 | 29.59 | 26.91 |
| Internal, Organic Phase | | | | | | |
| Cyclohexane | 70.28 | 70.16 | 58.71 | 67.14 | 67.77 | 70.10 |
| HDI | 2.53 | 2.43 | 2.15 | 2.41 | 2.35 | 2.72 |
| Total | 72.81 | 72.59 | 60.86 | 69.55 | 70.12 | 72.82 |
| Catalyst (added after HIPE formation) | | | | | | |
| Type | DBTDL | TEMED | DBTDL | DBTDL | DBTDL | DBTDL |
|  | 0.27 | 0.27 | 0.39 | 0.30 | 0.29 | 0.27 |
| $\rho_o$, g/cc | 0.051 | 0.050 | 0.095 | 0.041 | 0.065 | 0.052 |
| $\rho_c$, g/cc | 0.803 | 0.801 | 0.741 | 0.765 | 0.795 | 0.803 |

TABLE 4-continued

| $\rho_m$, g/cc | 0.695 | 0.446 | 0.113 | 0.414 | 0.207 | 0.512 |
|---|---|---|---|---|---|---|
| Encapsulation, % | 86 | 53 | 3 | 52 | 19 | 61 |

As can be seen in Table 4, up to 86% of the non-reactive part of the organic medium was encapsulated within the composition-of-matter, even after drying in a vacuum for 1 week, and most of the samples exhibited a behavior expected for a true closed-cell microstructure, as evidenced by being able to encapsulate more than 50% of the non-reactive part of the organic medium for at least 1 week under vacuum. Although all samples exhibited some retention of the non-reactive part of the organic phase, not all the predicted amount of the non-reactive part of the organic composition remained entrapped therein. For example, sample No. 73 lost most of the non-reactive part of the organic medium, leaving only 3% entrapped after 1 week under vacuum, whereas sample No. 75 entrapped about 20% of the non-reactive part of the organic medium.

It is assumed that some of the non-reactive part of the organic medium, which is mostly a highly volatile organic solvent (cyclohexane), evaporated between the time of forming the HIPE and the time the polymerization was completed; thus, the density predicted from the HIPE recipe is expected to be higher than the density based on the actual contents within the HIPE.

The non-reactive part of the organic medium content that could be practically added to the HIPE was reduced with increasing tannic acid contents (sample Nos. 73 and 75) due to the rapid polymerization that occurred during HIPE formation. In addition, the common feature of sample Nos. 73 and 75 is the relatively high amount of tannic acid, which is assumed to add free volume to the resulting polymer walls. The higher free volume may provide a diffusional path for the cyclohexane vapor under vacuum.

Figure 5A:
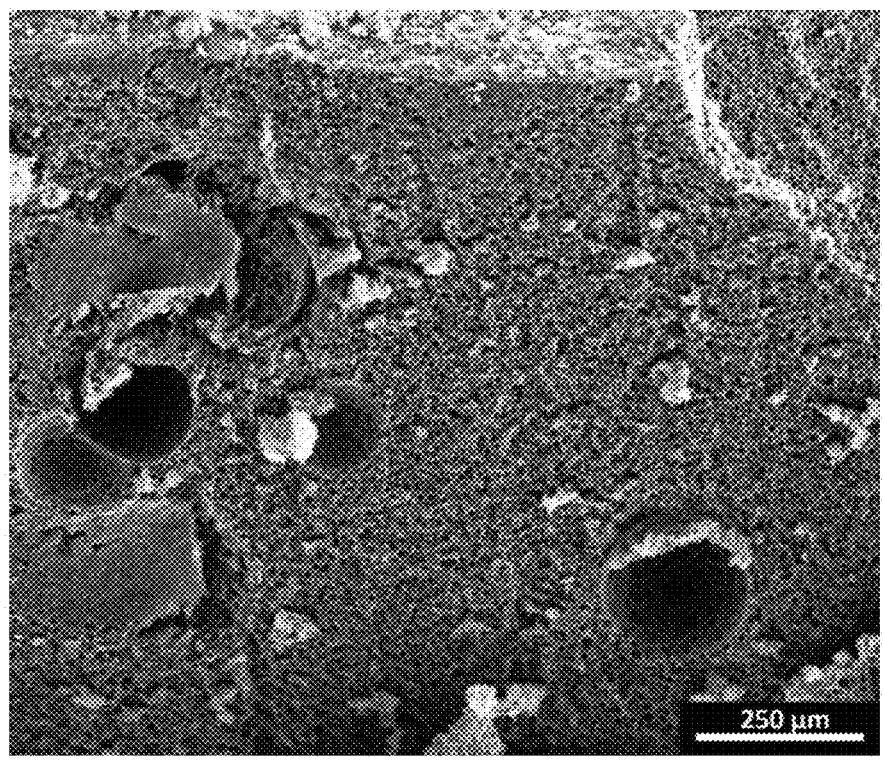
Figure 5B:
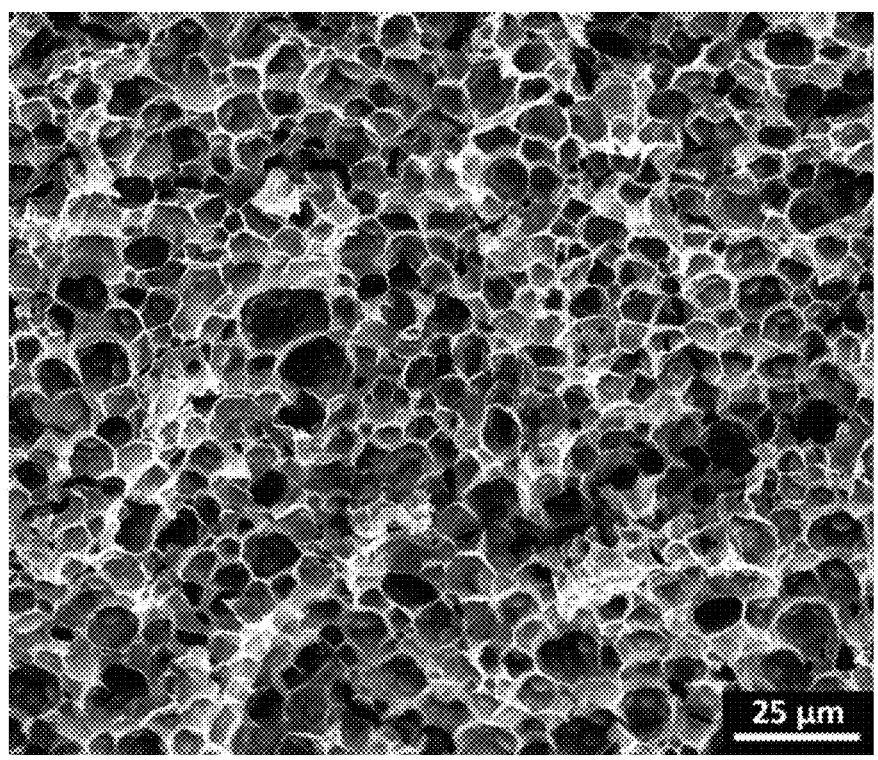
Figure 5C:
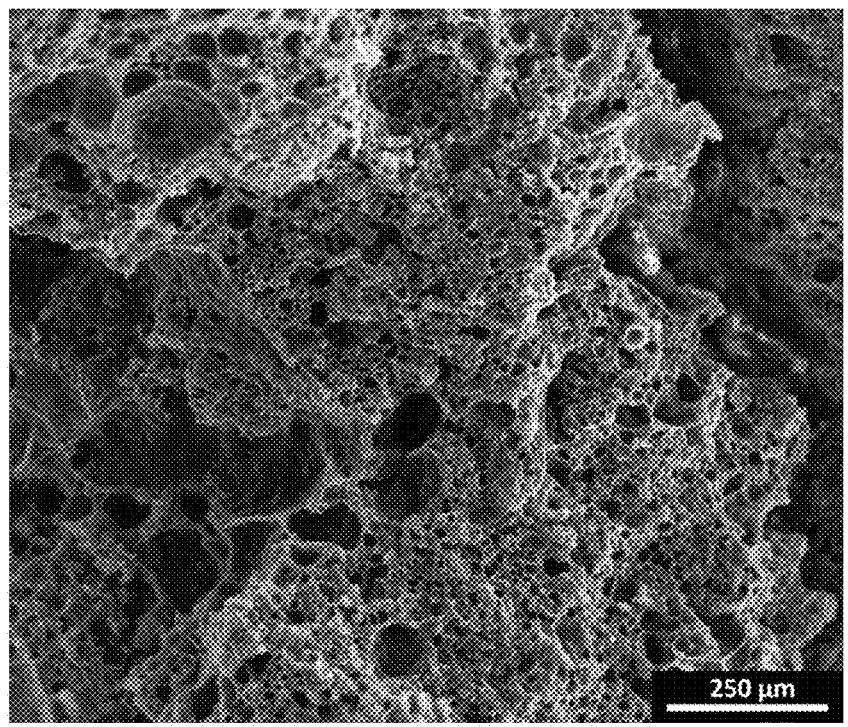
Figure 5D:
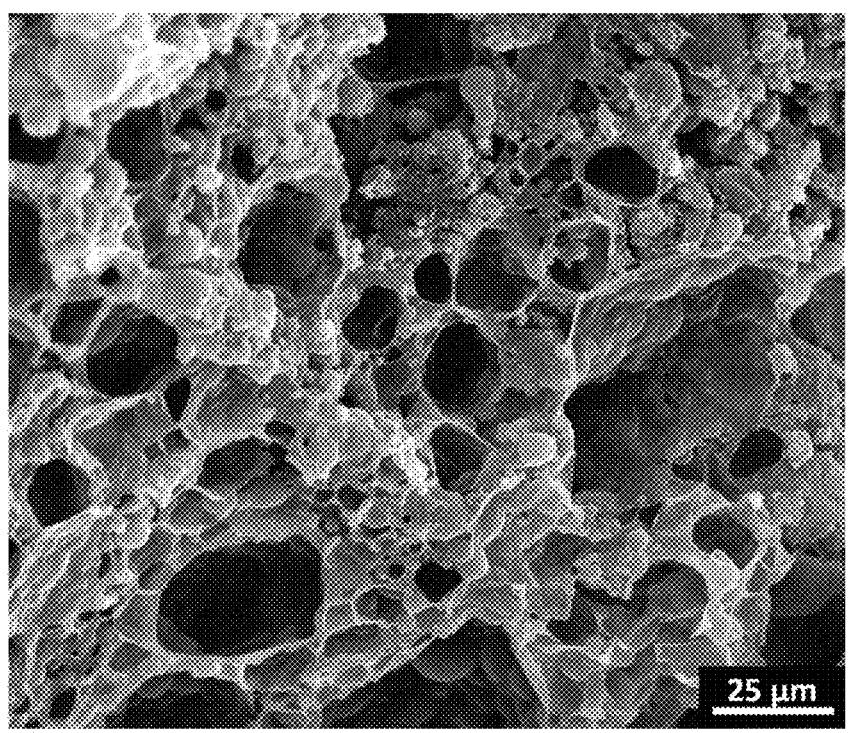
Figure 5E:
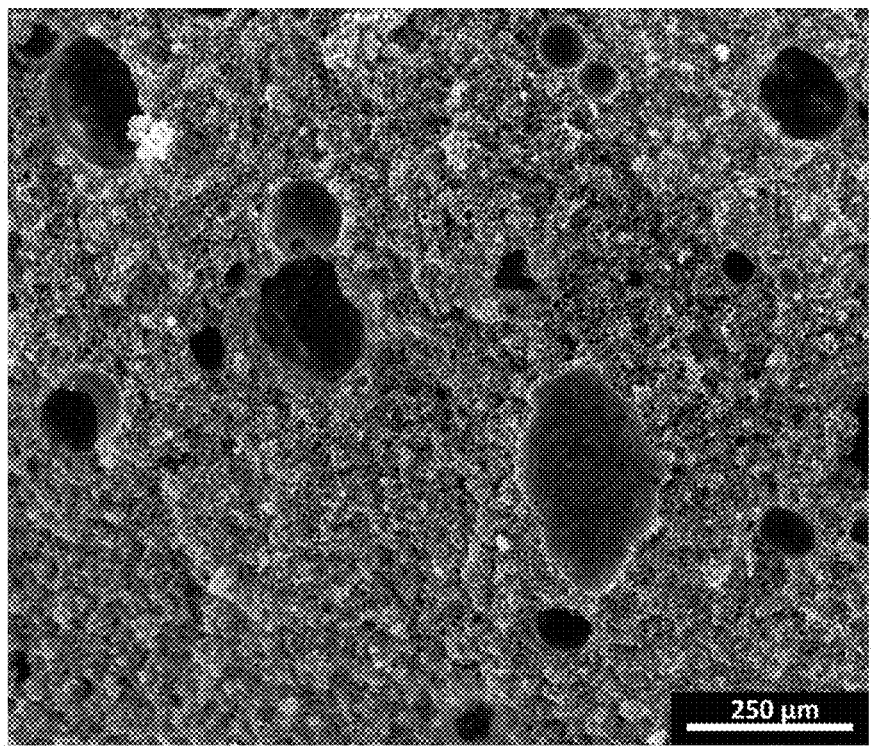
Figure 5F:
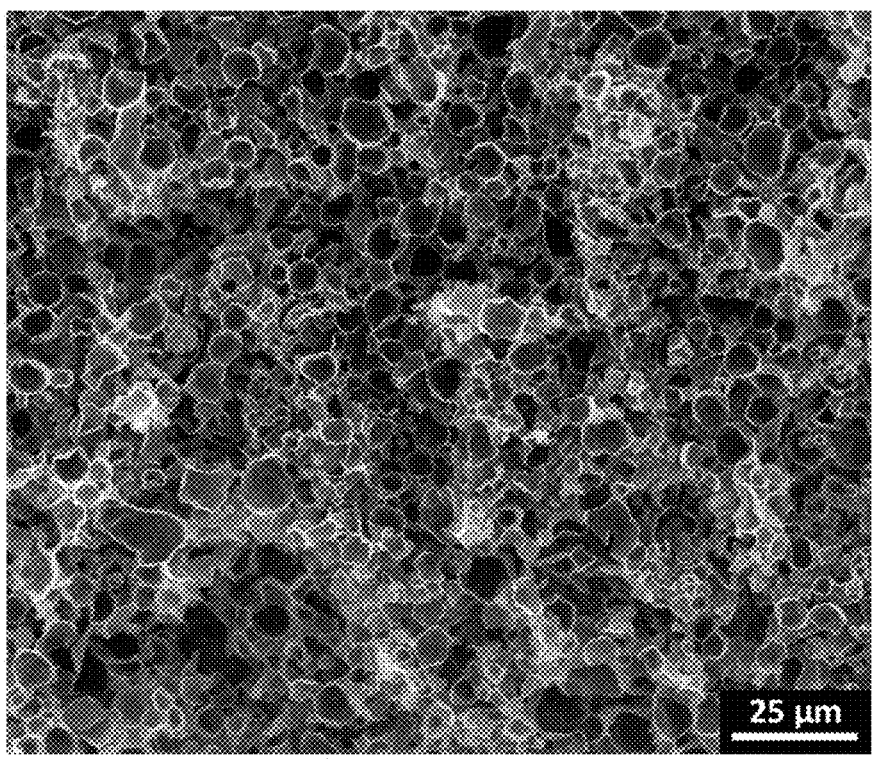
Figure 5G:
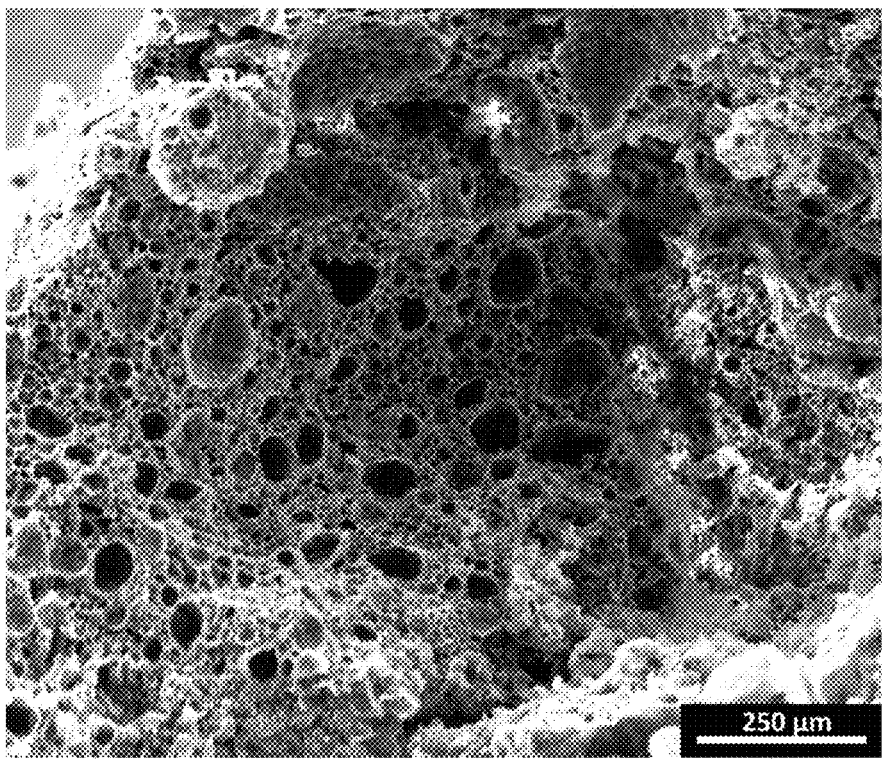
Figure 5H:
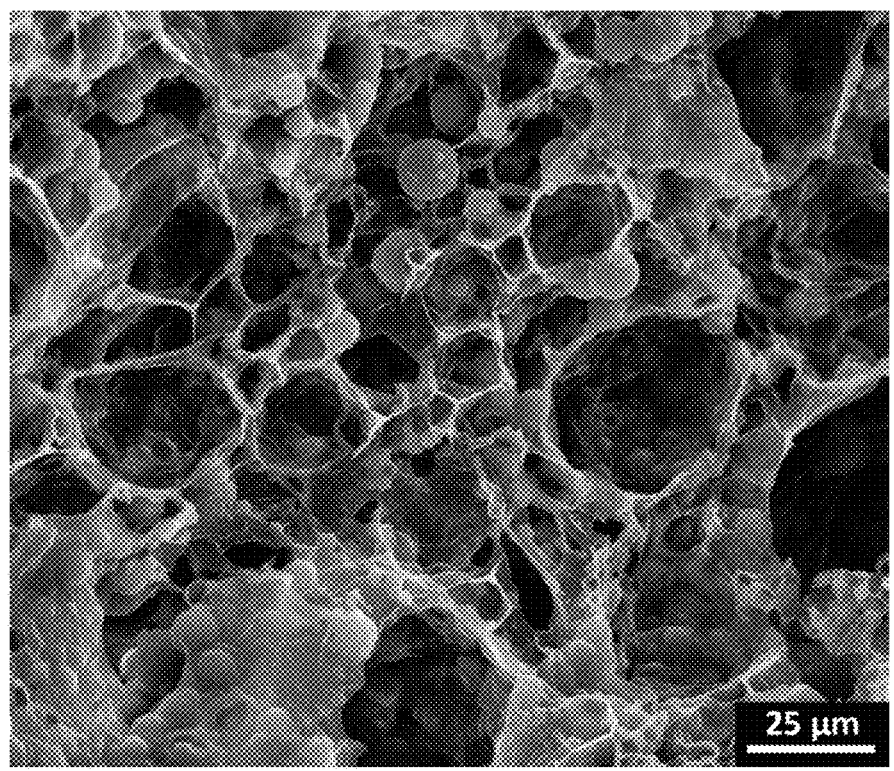
Figure 5I:
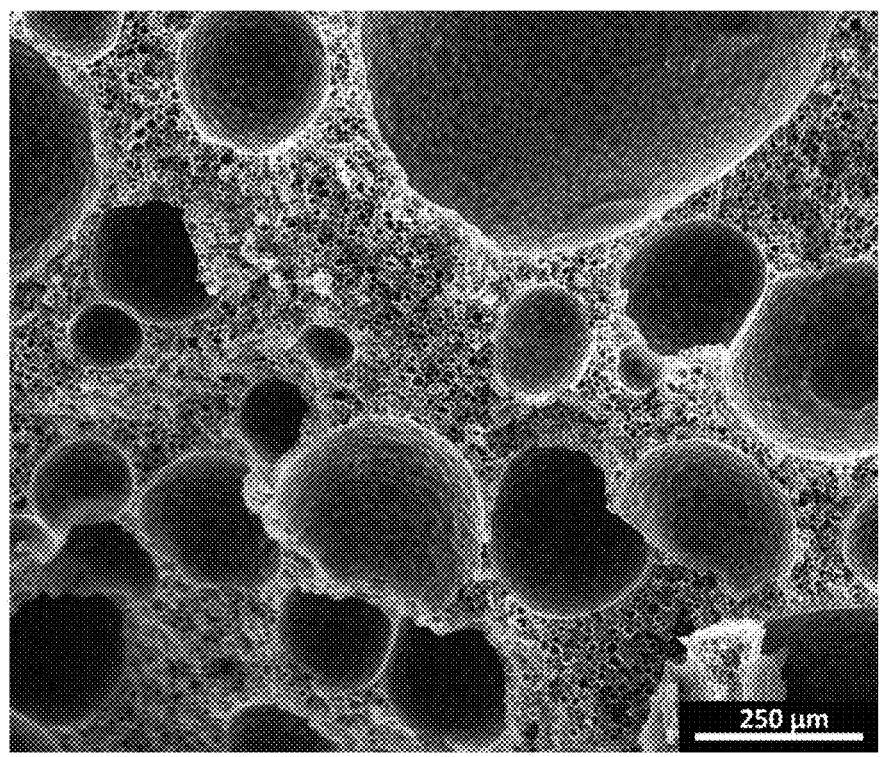
Figure 5J:
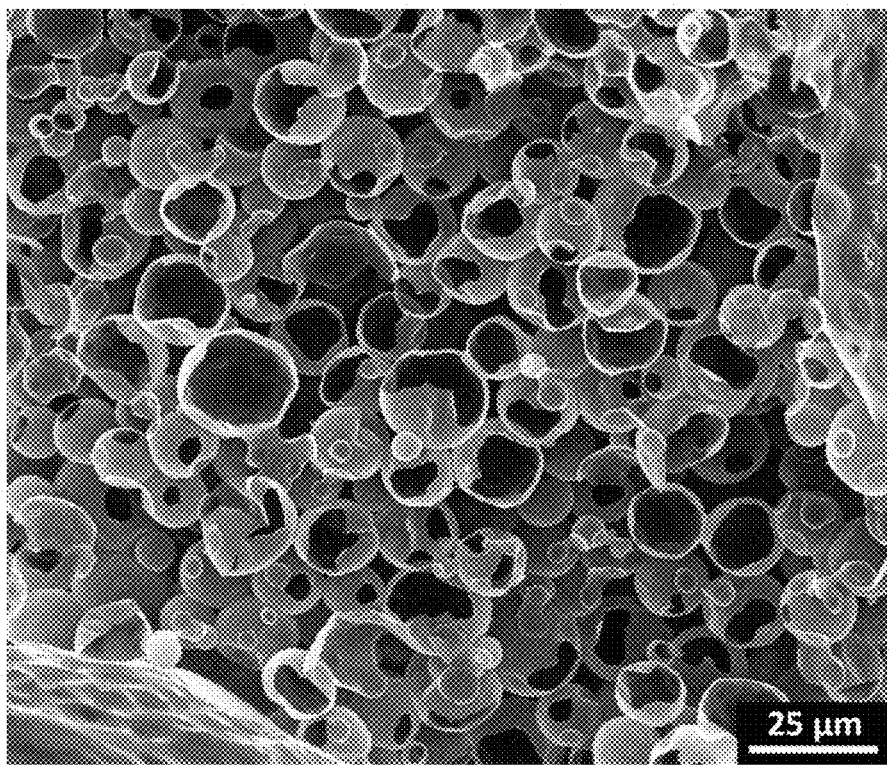
Figure 5K:
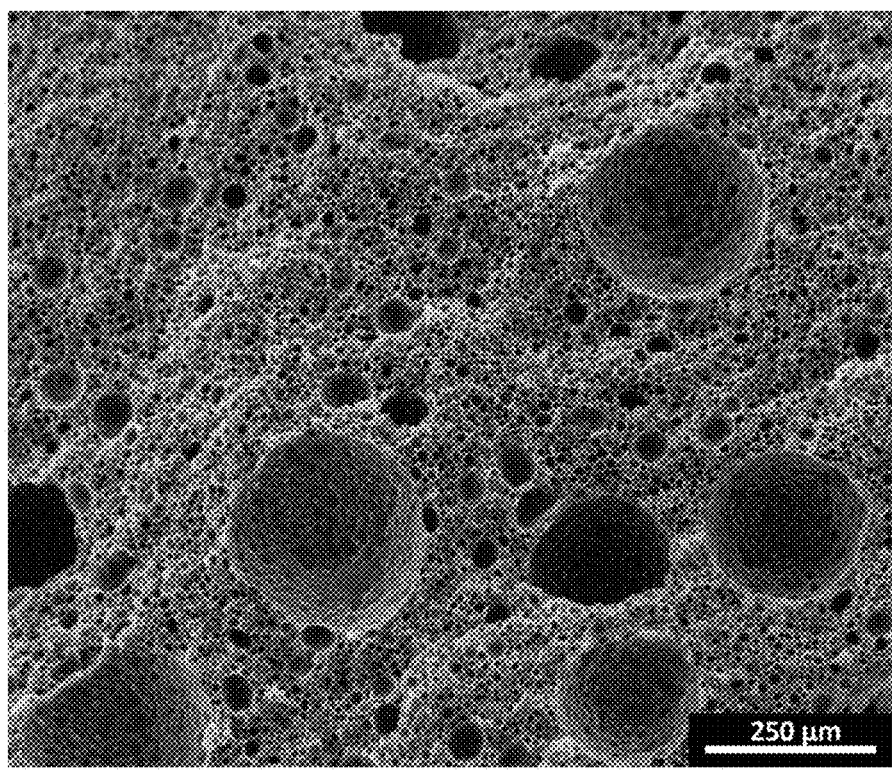
Figure 5L:
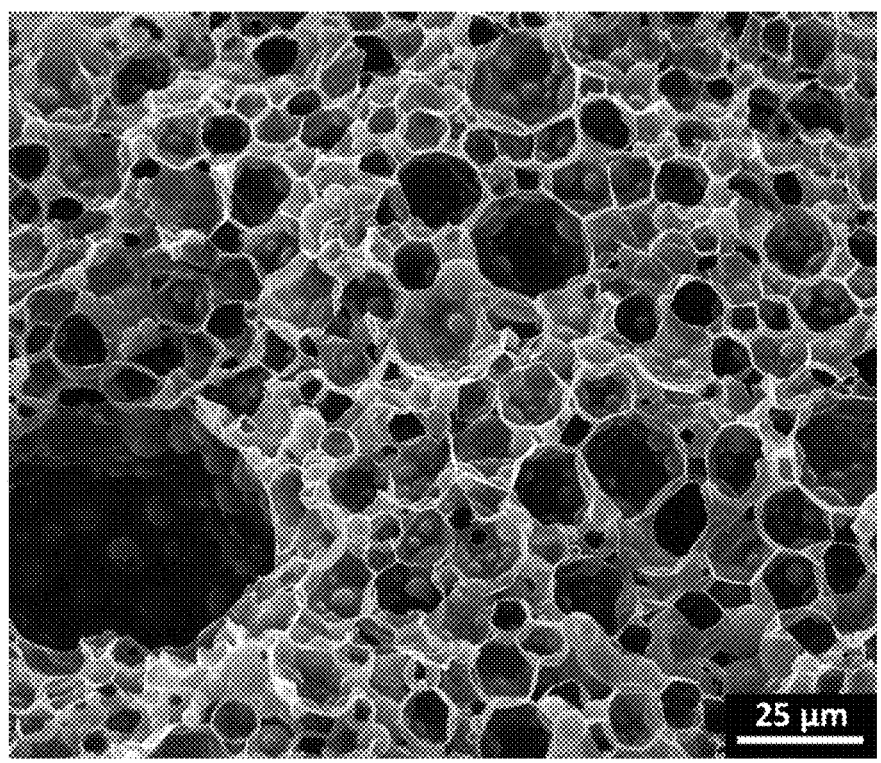

FIGS. 5A-L are electron-micrographs of samples of exemplary compositions-of-matter, according to some embodiments of the present invention, at two magnifications, wherein FIGS. 5A-B are of sample No. 65, FIGS. 5C-D are of sample No. 72, FIGS. 5E-F are of sample No. 73, FIGS. 5G-H are of sample No. 74, FIGS. 5I-J are of sample No. 75, and FIGS. 5K-L are of sample No. 76.

As can be seen in FIGS. 5A-L, the composition-of-matter, according to some embodiments of the present invention, exhibits some large craters, remnants of $CO_2$ bubbles that were generated during the polymerization reaction. The major bulk of the composition-of-matter appears to be an assembly of spheroid capsules, which is quite different than the open-cell foam-like appearance of highly interconnected voids, typical of most polyHIPEs. While not seen in the electron-micrographs, it is assumed that the cells in the samples are still filled with the non-reactive part of the internal phase, mostly cyclohexane, and that following fracture, the cyclohexane within the broken cells at the surface evaporates, leaving seemingly empty voids.

Figure 6:
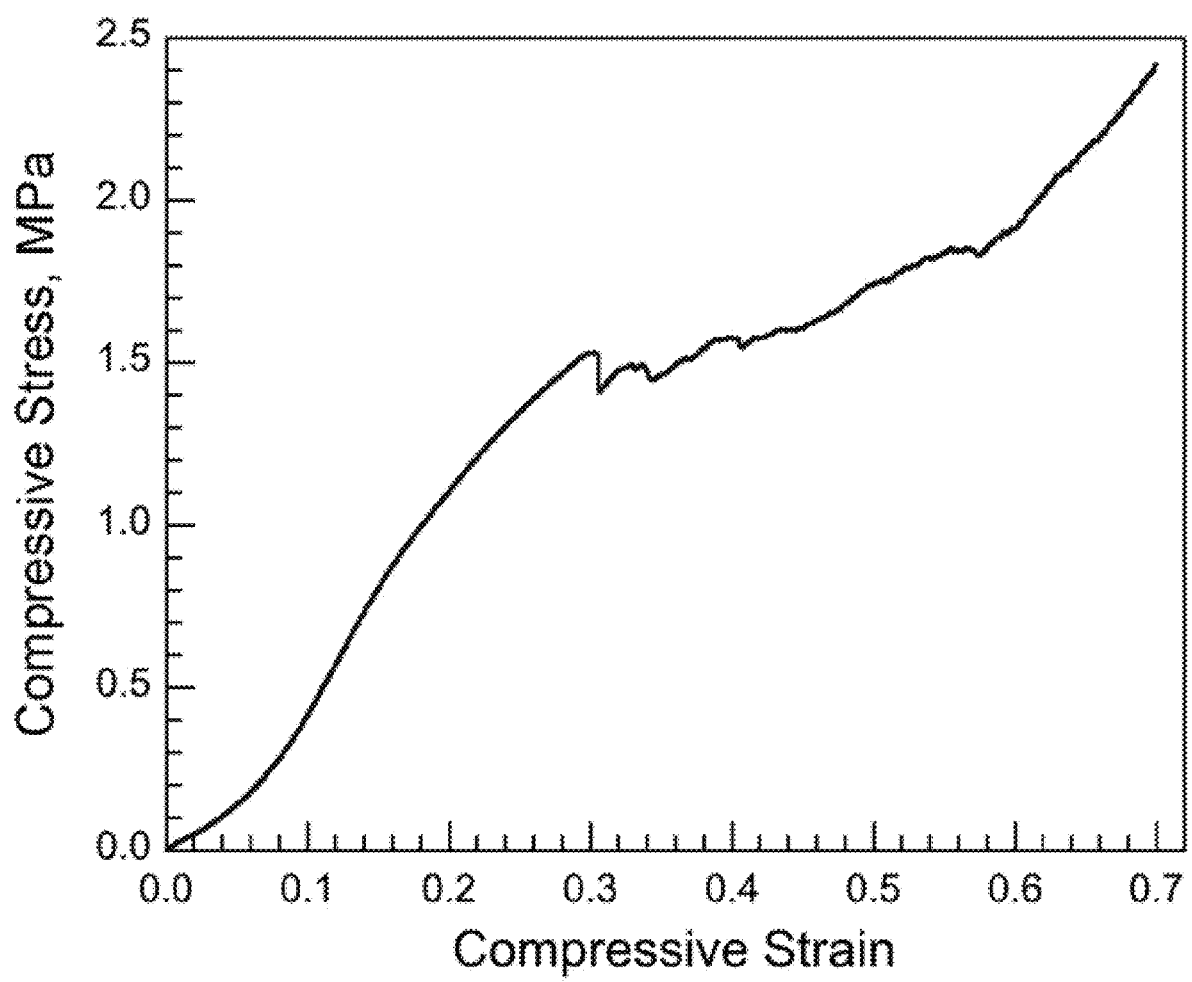
FIG. 6 is a compressive stress-strain plot measured for sample No. 65 at an average strain rate 13% per minute.

FIG. 6 presents a compressive stress-strain plot measured for sample No. 65 at a strain rate of 13% per minute.

As can be seen in FIG. 6, sample No. 65 exhibits a more closed-cell behavior (no stress plateau), with a linear stress-strain relationship at low strains (an average modulus of 7.3 MPa), a discontinuity at around 30% strain indicating the beginning of the internal failure of the relatively brittle wall structure, and a stress at 70% strain of 2.6 with no visible or obvious external large-scale failure of the sample.

Figure 7A:
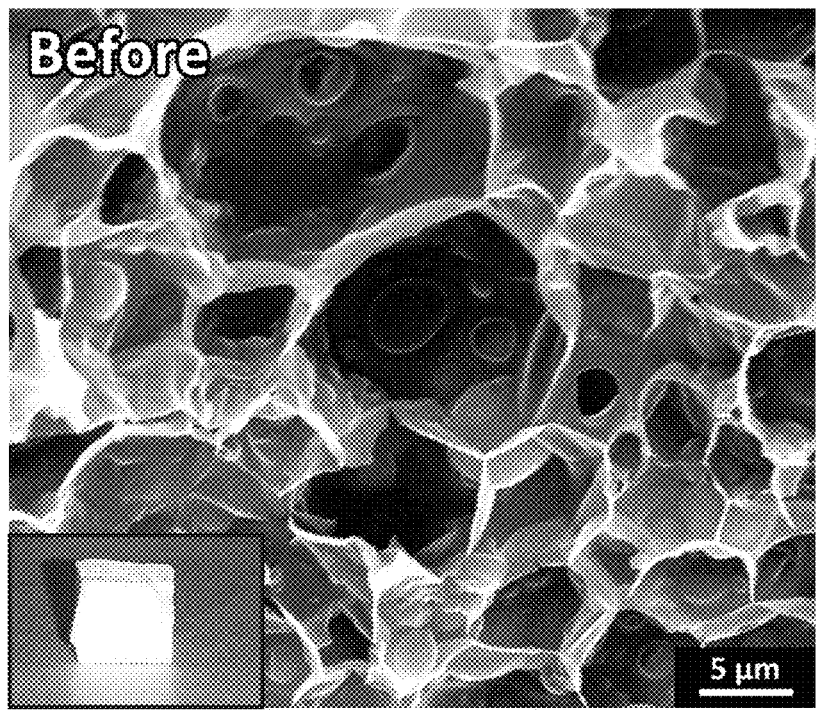
FIGS. 7A-B are electron-micrographs of sample No. 65 before stress-strain test which reached 70% strain (FIG. 7A) and thereafter (FIG. 7B), whereas the inset on the lower left corner of each of FIGS. 7A-B is a photograph of the entire sample.
Figure 7B:
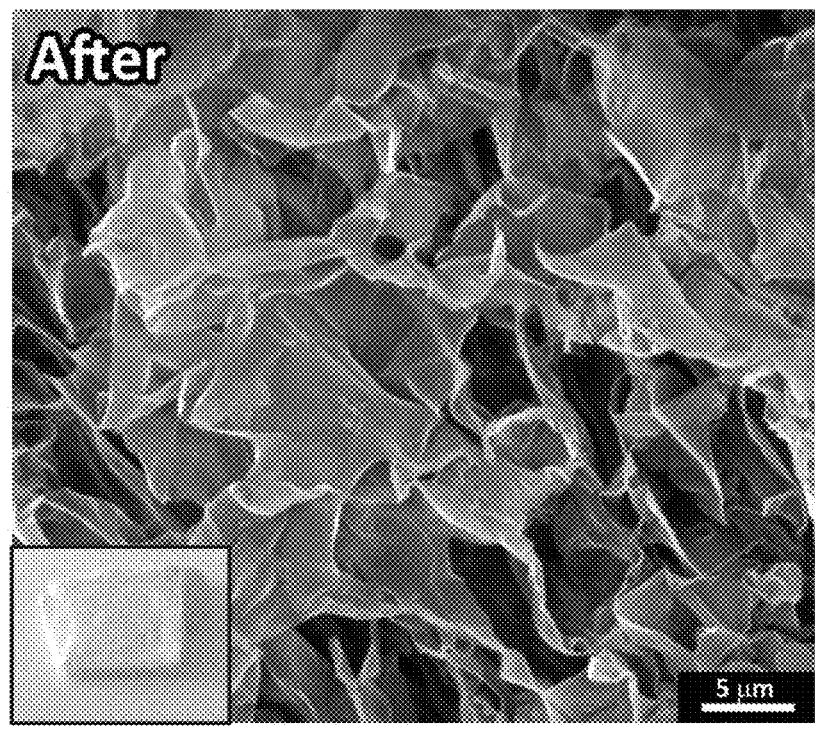

FIGS. 7A-B are SEM-micrographs of sample No. 65 before stress-strain test which reached 70% strain (FIG. 7A) and thereafter (FIG. 7B), whereas the inset on the lower left corner of each of FIGS. 7A-B is a photograph of the entire sample.

As can be seen in FIGS. 7A-B, the closed-cell composition-of-matter collapsed and did not regain its shape upon the removal of stress. At such strains, the majority of the closed-cells are fractured and the contents thereof is no longer encapsulated. That unique trait enables the use of the closed-cell composition-of matter to serve as a temporary vehicle for the entrapped organic medium, which can be released upon applying stress to the composition-of matter.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A composition-of-matter comprising a polymer, said polymer comprises alternating residues of at least one hydrophilic monomer and at least one hydrophobic monomer, and having a microstructure that is templated by a polymerized high internal phase emulsion (HIPE).

2. The composition-of-matter of claim 1, wherein said HIPE is a water-in-oil HIPE or an oil-in-water HIPE.

3. The composition-of-matter of claim 1, wherein said HIPE is a water-in-oil HIPE and the composition-of-matter has a closed-cell microstructure and further comprising an aqueous composition encapsulated therein.

4. The composition-of-matter of claim 1, wherein said HIPE is an oil-in-water HIPE and the composition-of-matter has a closed-cell microstructure and further comprising an organic composition encapsulated therein.

5. The composition-of-matter of claim 1, wherein said hydrophilic monomer is selected from the group consisting of a polysaccharide, a polyphenol, a glycoprotein, a polypeptide, a flavonoid, a glucoside, an aminoglucoside, a lignin and any combination thereof.

6. The composition-of-matter of claim 1, wherein said hydrophobic monomer is selected from the group consisting of a diisocyanate, a triisocyanate, a polyisocyanate, a diacylhalide, a triacylhalide, a polyacylhalide and any combination thereof.

7. The composition-of-matter of claim 1, wherein said polymer is devoid of an emulsion stabilizer that is not a monomer.

8. The composition-of-matter of claim 1, wherein said polymer further comprises an emulsion stabilizer.

9. A process of preparing the composition-of-matter of claim 1, the process comprising:
providing an organic solution that comprises said at least one hydrophobic monomer;
providing an aqueous solution that comprises said at least one hydrophilic monomer;
mixing said organic solution with said aqueous solution under stirring to thereby obtaining a HIPE; and
allowing said HIPE to polymerize,
thereby obtaining the composition-of-matter.

10. The process of claim 9, further comprising, subsequent to obtaining said HIPE, adding a polymerization catalyst to said HIPE.

11. The process of claim 9, wherein said aqueous solution and/or said organic solution further comprises an emulsion stabilizer.

12. The process of claim 9, wherein said HIPE is an oil-in-water HIPE, a concentration of said hydrophobic monomer ranges from 0.01 to 90 weight percent of the total weight of said HIPE, and a concentration of said hydrophilic monomer ranges from 0.01 to 40 weight percent of the total weight of said HIPE.

13. The process of claim 9, wherein said HIPE is a water-in-oil HIPE, a concentration of said hydrophobic monomer ranges from 0.01 to 40 weight percent of the total weight of said HIPE, and a concentration of said hydrophilic monomer ranges from 0.01 to 90 weight percent of the total weight of said HIPE.

14. An article of manufacturing comprising the composition-of-matter of claim 1.

15. The article of claim 14, selected from the group consisting of a fire-retardant device, a chemical detector device, a fragrance carrier and releasing device, an adhesive carrier and releasing device, a cosmetic carrier and releasing device, an energy storage device, an absorptive device, an explosive device, an energy absorbing device, an insecticide carrier and releasing device, a herbicide carrier and releasing device, a drug delivery device, a coloration device, a cleaning device, a sealing device, an ignition device, an incendiary device, a coating device, an insulating device, an anti-corrosion device, a nutrition device, a toxin carrier and releasing device, a water-releasing device, a salt releasing device, an aqueous solution releasing device, a disinfectant releasing device, and a lubrication carrier and releasing device.

* * * * *